US005316430A

United States Patent [19]

Horning et al.

[11] Patent Number: 5,316,430

[45] Date of Patent: May 31, 1994

[54] MATERIAL COLLECTING AND HAULING APPARATUS

[75] Inventors: Larry D. Horning, Crestline; Eugene R. Grubaugh, Galion; Thomas E. Pfeifer, Galion; Carroll R. Johnson, Galion, all of Ohio

[73] Assignee: Galion Holding Company, Galion, Ohio

[21] Appl. No.: 47,875

[22] Filed: Apr. 15, 1993

Related U.S. Application Data

[63] Continuation of Ser. No. 565,172, Aug. 8, 1990, abandoned, which is a continuation-in-part of Ser. No. 389,626, Aug. 4, 1989, abandoned.

[51] Int. Cl.[5] .............................................. B65G 67/02

[52] U.S. Cl. ...................................... 414/407; 296/26; 298/8 H; 298/24; 414/409; 414/512; 414/517; 414/525.55; 414/525.6

[58] Field of Search ................................ 414/406-409, 414/509, 512, 517, 518, 539, 420, 525.2, 525.55, 525.6; 296/26; 298/24, 25, 8 R, 8 H

[56] References Cited

U.S. PATENT DOCUMENTS

| | | | |
|---|---|---|---|
| 3,709,388 | 1/1973 | Neufeldt | 414/525.2 X |
| 4,978,271 | 12/1990 | Seader | 414/408 |
| 4,981,411 | 1/1991 | Ramsey | 414/409 X |
| 5,035,564 | 7/1991 | Matsumoto | 414/409 |
| 5,074,737 | 12/1991 | Pellegrini et al. | 414/406 |
| 5,078,567 | 1/1992 | Lombardo et al. | 414/525.6 |
| 5,094,582 | 3/1992 | Molzhor | 414/406 |
| 5,116,184 | 5/1992 | Pellegrini | 414/406 |

*Primary Examiner*—David A. Bucci
*Attorney, Agent, or Firm*—Niro, Scavone, Haller & Niro

[57] ABSTRACT

A waste hauling apparatus including a truck body divided into two separate compartments by a movable dividing wall. A bucket assembly having separate side-by-side bins is operative to transfer trash material loaded into the bucket by an operator at ground level to the isolated compartments. The bucket travels between a material receiving position and a material discharging position along a trackway having a path of movement including a vertical portion and a transverse portion. At the material discharging position the material contained in the bins is discharged into associated material receiving openings that communicate with respective compartments defined by the truck body. The bucket is reciprocally conveyed between the trash receiving and trash discharging positions by a chain drive mechanism driven by a fluid pressure operated motor and interconnected with the bucket by a linkage mechanism. The linkage mechanism cooperates with the chains to define the limits of movement for the bucket. The compartment dividing wall is used to adjust the volumes of the compartments and is transversely movable inside the truck body by a fluid pressure operated actuator. A discharge door forming part of the dividing wall is opened in order to empty the contents of one of the compartments, through the rear of the truck body as the overall truck body is raised and rotated about a rear pivot axis. Covers overlie the material receiving openings and are opened as the bucket moves to its material discharging position. In an alternate embodiment, the truck body includes upper and lower compartments divided by a fixed dividing wall. Each compartment includes an associated packing blade. A hydraulic control system coordinates movement in the blades and bucket.

37 Claims, 12 Drawing Sheets

MATERIAL COLLECTING AND HAULING APPARATUS

This is a continuation of U.S. Ser. No. 07/565,172, filed Aug. 8, 1990 (abandoned), which is a continuation-in-part of U.S. Ser. No. 07/389,626, filed Aug. 4, 1989 (abandoned).

TECHNICAL FIELD

The present invention relates generally to material collecting and hauling and in particular to an improved waste hauling vehicle including multiple compartments for receiving, and maintaining the segregation of diverse waste materials.

BACKGROUND ART

The disposal of waste material generated by today's consumption oriented society has become a serious problem. The shortage of nearby landfill sites has forced some communities to consider and even adopt mandatory recycling programs. The purpose of the recycling program is not necessarily the generation of income from the recycled materials but instead the goal is to reduce waste collection costs by avoiding the necessity of transporting waste material over long distances and in some cases across state lines. In addition, these recycling programs conserve resources and save or reduce the need for landfills.

Trash collecting vehicles adapted to separately collect recyclable trash such as bottles, cans and newspapers have been suggested. Some of these vehicles are simply constructed as an assembly of separate bins having associated loading openings. The operator selectively dumps the refuse into the appropriate bins.

In communities in which mandatory recycling is employed, the residents may be required to segregate their waste into two or more collection containers. For example in some communities each resident has a container for bottles and cans, a container for newspapers, and a container for all other trash. The containers themselves may be color coded to facilitate collection by the trash collection service.

In an effort to expedite the trash collection process, some communities collect certain types of trash on certain days. For example, bottles and cans may be collected on one day of the week, newspapers on another day of the week and the remaining trash on still another day of the week. Consequently, residents are required to place trash at curbside on multiple days each week. It is considered desirable to, if possible, collect all the trash on a single day.

Vehicles having multiple compartments and means for loading the trash into the compartments have been suggested in the past. For example, U.S. Pat. No. 4,425,070 illustrates a separated discards carrier which includes a power dump "glass" bucket, a power dump "can" bucket and a rack for receiving paper.

Another example of a multiple compartment vehicle is shown in U.S. Pat. No. 4,480,531 to Dinneen, which includes an elongated trough extending along the longitudinal side of the body. The trough is divided into multiple compartments and is raised and lowered to empty the contents of the trough into a divided trash receiving compartment.

A similar vehicle configuration is shown in U.S. Pat. No. 4,915,570. The disclosed vehicle includes multiple, individual buckets disposed along the longitudinal side of the truck body which are raised and lowered to empty trash into compartments defined by vertical, transverse walls positioned within the body. In Canadian Patent No. 1,264,702 a similar construction is illustrated. The disclosed vehicle also utilizes a plurality of individual buckets disposed along the side of the truck body.

In German Patent No. DE3537546 a refuse collecting vehicle is illustrated which includes a chassis subdivided by horizontal partitions. A multi-compartment bucket is used to transport trash from curb level to openings defined in the body. Trap doors disposed in the partitions are opened and closed in order to communicate openings in the roof of the truck body with the compartments. Rams are used to push material from the front of the truck body towards the rear.

Other prior suggested vehicles require the operator to change the loading position as the compartments fill with trash. For example, as the front end of the compartment is filled, the operator is required to move along the length of the vehicle to place trash at the rear of the compartment.

Still others, require that one type of trash be loaded at the front of the vehicle whereas the other type of trash be loaded from a different location. In other words, the operator is required to separately load the compartments from different loading positions thereby substantially increasing the work effort that must be expended by the operator in loading the vehicle.

DISCLOSURE OF THE INVENTION

The present invention provides a new and improved apparatus or vehicle for concurrently collecting, and maintaining the segregation of, diverse waste material such as bottles, cans and newspapers. According to the invention the apparatus includes a mechanism for separately dumping the collected materials. This function is performed automatically with minimal intervention by the operator.

According to the invention, separated compartments are loaded by the operator at a loading region located near the front of the vehicle. Unlike some prior art devices, the operator is not required to change the loading location as the compartments fill with material. In accordance with this feature, a compartment loading device is used to transfer material from substantially ground level to the compartments.

According to the invention, a material packing device is utilized in at least one compartment to urge material towards remote locations of the compartment. This feature eliminates the need for the operator to re-distribute the material in the compartments or to change the operator loading position as is the case with some prior art devices.

With the present invention, the collection of at least two different materials can be efficiently achieved, without requiring excessive effort on the part of the operator. In particular, with the disclosed invention, the material being collected is loaded by the operator at a location near the front of the vehicle and at a relatively low loading height. As the compartments fill, the operator is not required to change the loading position to effect distribution of the collected material in the vehicle.

In the preferred and illustrated embodiment, the vehicle includes a truck body divided into at least two, substantially isolated compartments. In one application, one compartment is adapted to receive bottles and cans whereas the other compartment is adapted to receive newspaper and like material. According to the invention, the size or volume of the compartments is adjustable during use.

The material is transferred from the operator loading position (i.e. curbside or ground level) to the appropriate compartments by a loading device which in the preferred and illustrated embodiment includes at least one power driven bucket assembly. The bucket assembly travels along structure that defines a path of travel extending from the operator loading position to compartment inlet openings located near the top of the vehicle. According to this feature of this embodiment of the invention, the loading apparatus is arranged and configured to minimize the protrusion or extension of the bucket assembly beyond the perimeter of the vehicle. The disclosed arrangement reduces the clearance necessary for operating the apparatus and enables the vehicle to be operated in relatively close quarters. This feature is at least partly achieved by configuring the truck body to include a narrower cross-section at the operator loading region. In particular, the truck body is configured so that a recess is formed in a sidewall near the front of the vehicle. The bucket assembly operates within the recess and as a result does not extend beyond the side walls of the vehicle for at least most of its travel.

In accordance with one embodiment of the invention, the bucket assembly is preferably a unitary structure divided into two separate bins. The operator or operators place the presorted trash into the appropriate bin of the bucket assembly and a hoist mechanism transports the bucket to separate trash receiving or compartment inlet openings located in or near the top of the vehicle into which the trash held by the bucket is dumped. The separate openings communicate with the appropriate trash holding compartments in the truck body.

In accordance with this embodiment of the invention, the compartments are separated by a moveable dividing wall which includes an actuating device for moving the wall to adjust the volumes of the compartments. In one preferred and illustrated embodiment, the dividing wall is L-shaped in construction and includes a transverse portion supported on tracks formed within the truck body. In this embodiment, the L-shaped wall divides the truck body into "front" and "rear" compartments. A vertical extension extends downwardly from one end of the transverse section and in the preferred embodiment pivotally mounts a discharge door which is opened to dump the contents of the front compartment. In addition, the vertical section of the dividing wall may be used as a ram to compact material in the rear compartment and/or to aid in the discharge of the material from the truck body at the dump site.

According to a further feature of this embodiment, the material packing device comprises a transfer ram that is located in the rear compartment and is used to push material from below the associated compartment inlet opening towards the rear of the rear compartment.

According to another feature of this embodiment of the invention, the truck body preferably includes two bucket assemblies for carrying the trash to the appropriate compartments so that trash can be loaded into the truck body from either side of the vehicle.

Separate hoist systems are used to raise and lower the bucket assemblies and in the preferred embodiment each hoist system comprises a pair of spaced apart conveyor chains co-driven by a hydraulic motor. The chains are preferably transversely spaced and located near opposite ends of the bucket.

The bucket assembly is supported for movement along a predetermined path by a roller and track mechanism. The path of movement for the bucket assembly includes a substantially vertical portion and a transverse portion extending substantially 90 degrees from the vertical portion. The vertical and transverse portions are interconnected by a curved track portion. As an upper roller (or rollers) forming part of the bucket assembly moves along the curved and transverse track portions,, the bucket assembly is rotated to discharge its contents into the compartment inlet openings.

According to a further aspect of this feature, the bucket assembly is constructed without an inside defining wall. According to this feature, material is confined within the bucket by external bucket defining walls and a fixed exterior side wall mounted to, or forming part of, the truck body. As a result, the material held by the bucket starts to discharge as soon as the bucket reaches the edge of the compartment inlet opening located at the top of the truck body. The disclosed construction eliminates the need for overturning the bucket in order to dump its contents. An inclined bottom wall forming part of the bucket requires that the bucket be turned 90° or less to dump its contents.

In the preferred and illustrated embodiment, a link mechanism connects the bucket assembly to the drive chains. The link mechanism acting in cooperation with the roller and track mechanism transfers motion in the chains causing the bucket to travel from a trash receiving position (located at ground level or curbside) to a trash discharging position. In addition the linkage cooperates with the chains and track mechanism to define stops to limit the travel of the bucket between lower and upper limits (which define the trash receiving and trash discharging positions, respectively). With this arrangement, separate mechanical stops to limit the motion of the bucket are eliminated.

According to a feature of the invention, movement in the transfer ram (located in the rear compartment in one of the embodiments) is coordinated with the raising and lowering of the bucket assembly. In particular,, when the assembly is raised, the transfer ram is actuated in one direction i.e. retracted and when the bucket is lowered, the transfer ram is actuated in the opposite direction. For example, in one configuration, an actuator associated with the transfer ram is retracted whenever the hydraulic system for the bucket assembly is actuated to raise the bucket. When the bucket is lowered, the actuator for the transfer ram is cu extended. With this disclosed feature, the movement in the transfer ram is automatic and does not require separate manual actuation by the operator.

According to still another feature of this embodiment of the invention, fluid pressure operated actuators are used to maintain closure of the discharge door forming part of the moveable dividing wall. In the preferred and illustrated embodiment, the actuators are double acting. When material from the front compartment is to be discharged, the overall truck body is raised and the double acting actuator or actuators attached to the discharge door are retracted by pressurized fluid under the control of a control system in order to open the discharge door. The material in the front compartment is thus dumped through the rear of the vehicle which includes a conventional rear door. After discharge of the material, pressurized fluid is communicated to the actuators to cause extension of the actuators and closure of the discharge door. By pressurizing the actuators, door closure is maintained.

According to still another feature of the invention, the compartment inlet openings located on the top of the truck body are covered by pivotally mounted covers which are opened as the bucket assembly is raised to its discharge position and which close as the bucket returns to its loading position at the bottom of the track. The material is enclosed, contained and/or covered at all times during the loading, transfer and discharge operations. Spillage of material due to wind conditions etc., is minimized.

According to another embodiment of the invention, the truck body is divided into upper and lower compartments by a fixed, transverse partition which substantially extends the full length of the truck body. In this embodiment, the vehicle may include one bucket assembly that is located in a recess defined by the truck body and positioned near the front of the vehicle. In this embodiment, transfer rams are located in both compartments and are actuated in order to move material towards the rear of each compartment.

The illustrated embodiment of the invention provides a high capacity truck body that is easily loaded from the front of the vehicle. It has been found that a truck body utilizing this invention can be constructed having a capacity of forty cubic yards while retaining external dimensions that are acceptable in the industry.

According to a feature of this embodiment, a pressurized fluid system (preferably a hydraulic system) is provided for automatically actuating both of the transfer rams in a predetermined sequence to minimize the quantity of pressurized fluid needed to effect movement of the associated actuators. In particular, a pressurized fluid system is provided in which fluid exhausted by one transfer ram actuator is used to drive the actuator associated with the other ram. As a result, the volume of pressurized fluid needed to achieve actuation of both rams is substantially reduced.

According to a further feature of this embodiment, a ram actuator control is provided for automatic cycling both rams with the actuation of a single control. A single control operation affects reciprocating movement in both ram actuators.

According to still another feature of this embodiment, the actuation of the transfer rams is coordinated with the operation of the bucket assembly. According to this feature, actuation of the bucket assembly to transfer trash from curb side to the trash receiving openings defined by the truck body effects reciprocating movement in both transfer rams. With this disclosed feature, the manipulation of a single operator control effects raising and lowering of the bucket and cycling of the transfer rams.

With the disclosed invention, a waste hauling vehicle can be constructed having a relatively small size while retaining a rather large capacity for waste materials. In addition, the operator loading position remains near the front of the vehicle at all times irrespective of the level of material in the compartments. The external configuration of the body including the recess or offset eliminates the need for large operating clearances for the bucket assemblies at the top and sides of the vehicle.

With the disclosed invention, various types of material can be separately collected in an expeditious manner. At least two types of material such as bottles/cans and newspapers can be collected simultaneously and then transported to an appropriate location or locations and separately discharged. The disclosed apparatus does not add to the burden of the vehicle operator since the material itself is loaded at normal working heights from the curb and is transported by the power driven bucket assembly to the compartment openings.

Additional features of the invention will become apparent and a fuller understanding obtained by reading the following detailed description made in connection with the accompanying drawings.

BEST MODE FOR CARRYING OUT THE INVENTION

Figure 1:
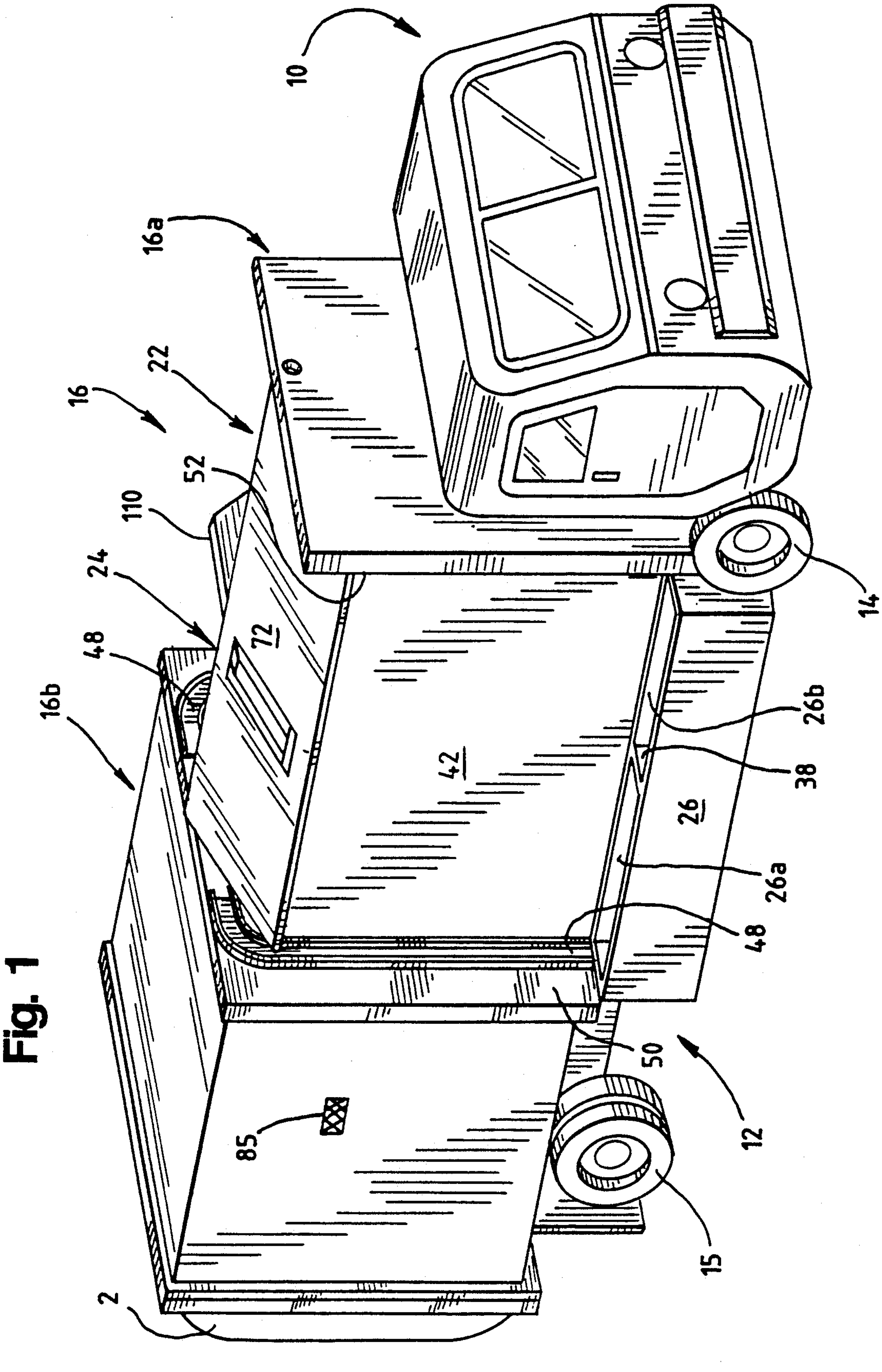
FIG. 1 is a perspective view shown somewhat schematically, of a waste hauling vehicle embodying the present invention.

FIG. 1 illustrates the overall construction of a vehicle for material or waste hauling constructed in accordance with one preferred embodiment of the invention. The vehicle includes a conventional truck cab 10 mounted to a truck frame, indicated generally by the reference character 12. Wheels 14, 15 as well as a conventional power train (not shown) for driving the rear wheels 15 are also mounted to the frame. The elements 10, 12, 14 and 15 described above are considered conventional and do not form part of the invention.

Figure 2:
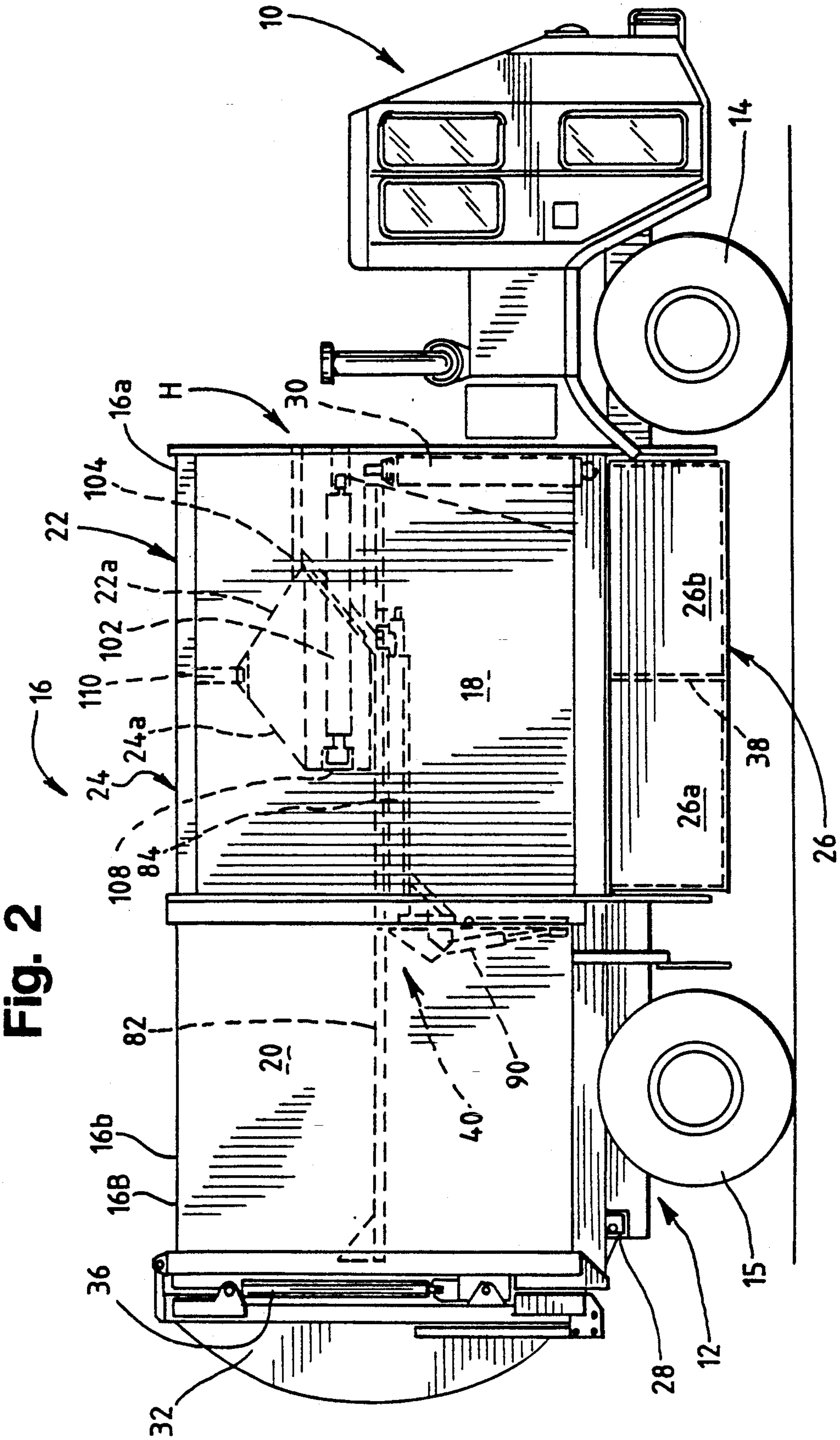
FIG. 2 is a side elevational view of the vehicle shown in FIG. 2.

In accordance with the invention, a truck body indicated generally by the reference character 16 is mounted to the truck frame 12. Referring also to FIG. 2, the truck body 16 defines two internal compartments 18, 20 (shown best in FIG. 2) which receive trash through associated openings 22, 24, formed in the top of the truck body 16.

Figure 3:
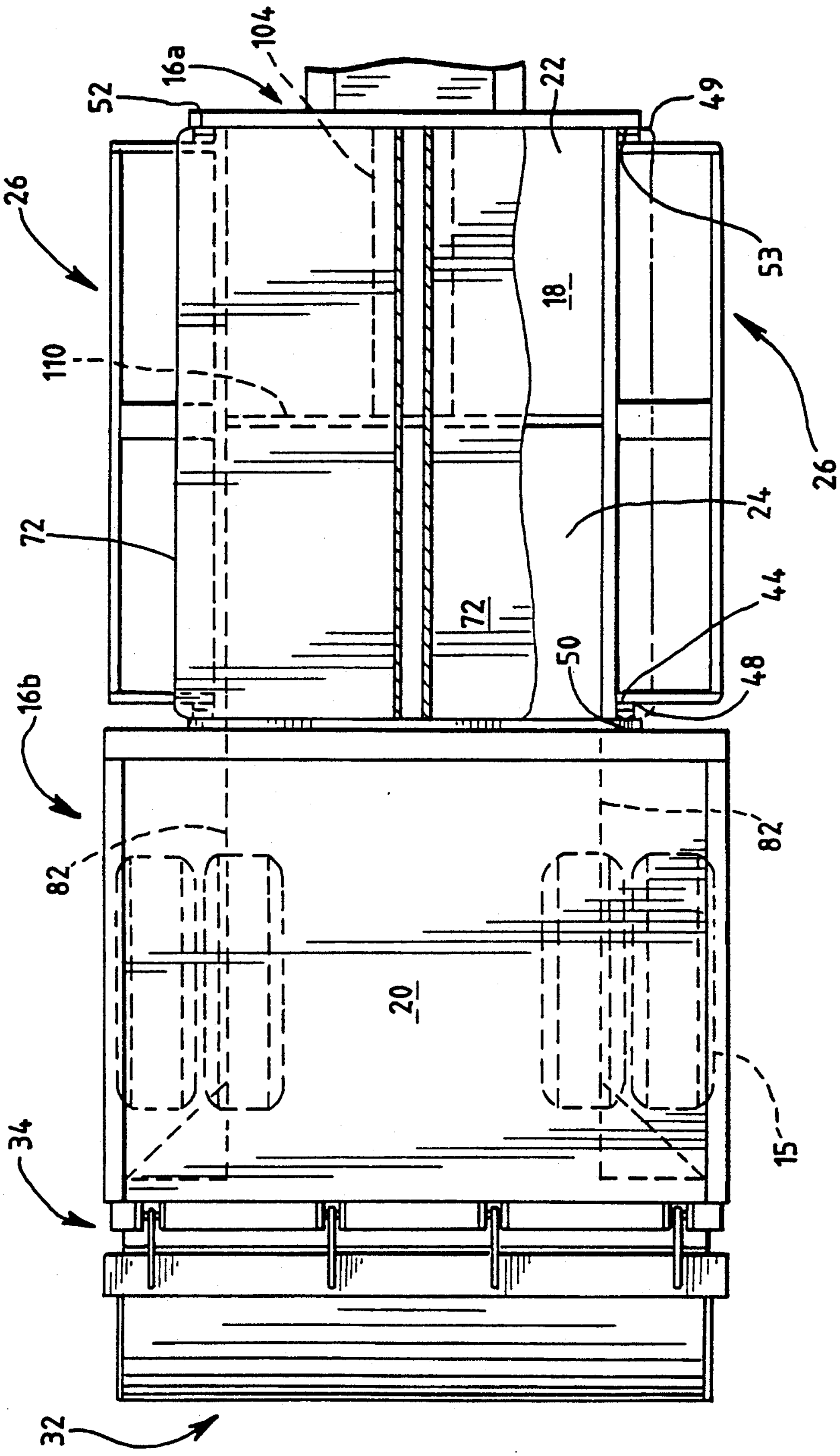
FIG. 3 is a top, fragmentary view of the vehicle shown in FIG. 1.

Trash is lifted and dumped into the openings 22, 24 by a bucket 26. In one preferred embodiment, a similar bucket 26 is mounted on the other side of the vehicle as shown in FIG. 3. As seen best in FIG. 1, the truck body 16 is divided into a narrow section 16a and an enlarged section 16b. The truck body 16 is preferably pivotally mounted to the frame at pivot connections 28 (FIG. 2) such that the truck body 16 can be pivoted upwardly by a lifting cylinder 30 located behind the cab 10. The cylinder 30 is protected from the material in the forward compartment 18 by a shield 31. The body 16 pivots about a transverse axis defined by the pivots 28. A rear discharge door 32 is hingedly connected to the enlarged truck body portion 16b by a hinge mechanism 34 indicated generally in FIG. 3. As will be explained, trash accumulated in the compartments 18, 20 is discharged separately through the rear discharge door 32. As is conventional, hydraulic cylinders 36 (only one is shown in FIG. 2) are operated to open and close the door 32.

As seen best in FIG. 2, trash received through the opening 24 is received in the rear internal compartment 20 whereas the trash received in the opening 22 falls into the forward internal compartment 18.

The bucket 26 is divided into two side-by-side, isolated bins 26a, 26b separated by a dividing wall 38. Trash placed in the bin 26a is conveyed to the rear compartment 20 via the opening 24, whereas trash placed in the bin 26b is conveyed to the compartment 18 (via the opening 22). As should be apparent, both compartments can be filled simultaneously with separated trash.

In the illustrated embodiment, the construction and the internal division of the truck body facilitate the simultaneous collection of paper-related products and bottles/cans. In the preferred embodiment, paper products are received in the rear compartment 20 and the bottles and cans are received in the forward compartment 18. In the preferred method of operation, residents would maintain separate containers for paper-related trash and bottles/cans. The trash hauler would then dump the paper from the appropriate container into the bin 26a and then dump bottle/can containers into the bin 26b. When the bins are filled, a drive mechanism, to be explained, raises the bucket 26 to a top of the truck body, at least partially overturns the bucket to dump the contents of the bin 26a into the opening 24 and the contents of the bin 26b into the opening 22.

Figure 4:
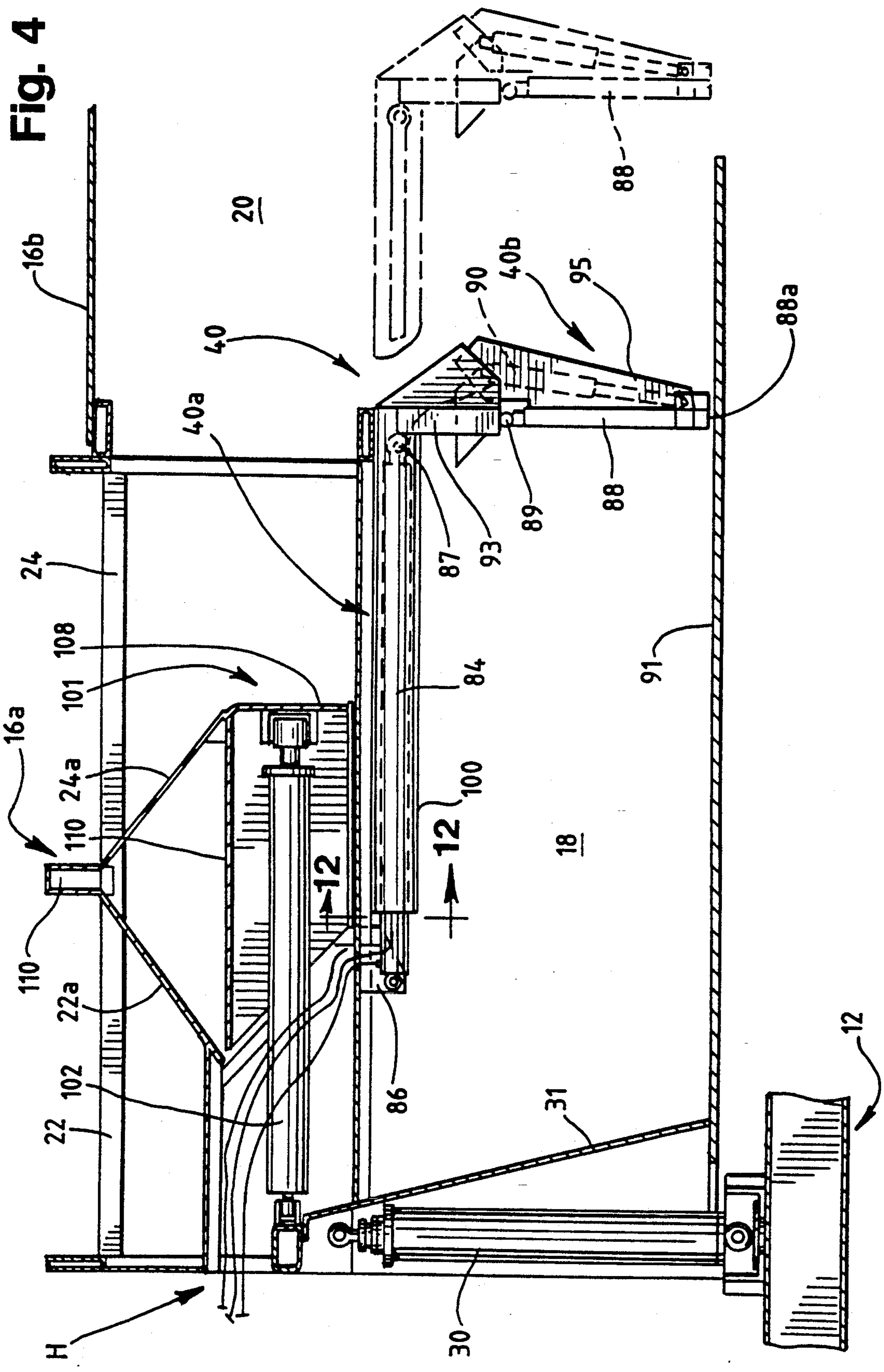
FIG. 4 is a fragmentary, side view of the internal details of the vehicle shown in FIG. 1.

As seen best in FIGS. 2 and 4, the front and rear compartments 18, 20 are separated by an L-shaped wall, indicated generally by the reference character 40. In the preferred and illustrated embodiment, the L-shaped dividing wall 40 is movable in order to adjust the volumes of the front and rear compartments 18, 20. FIG. 4 illustrates two positions of the divider wall. Divider wall 40 includes a transverse portion 40a, which is floor-like is construction and a vertical portion 40b.

Figure 5:
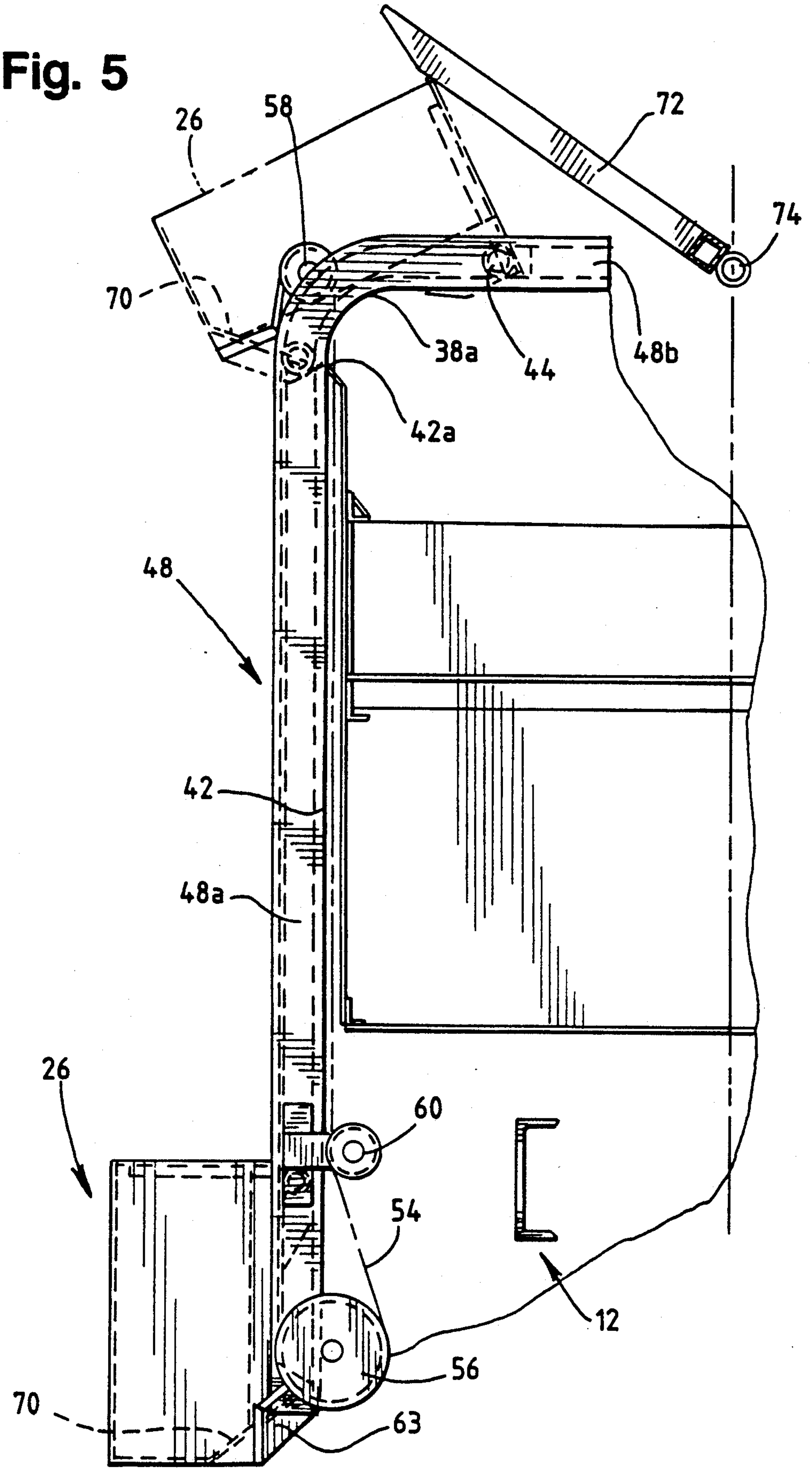
FIG. 5 is a fragmentary view, partially in section illustrating the construction of a bucket conveyor embodying the present invention.
Figure 7:
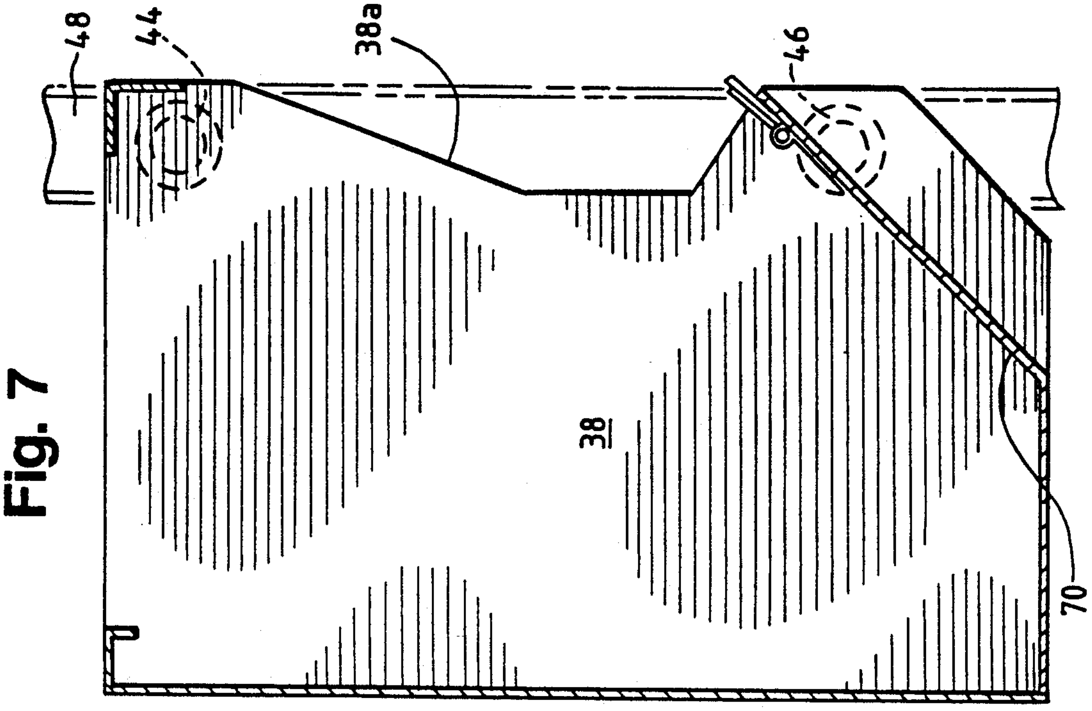
FIG. 7 is a sectional view of the bucket shown in FIG. 5.
Figure 6:
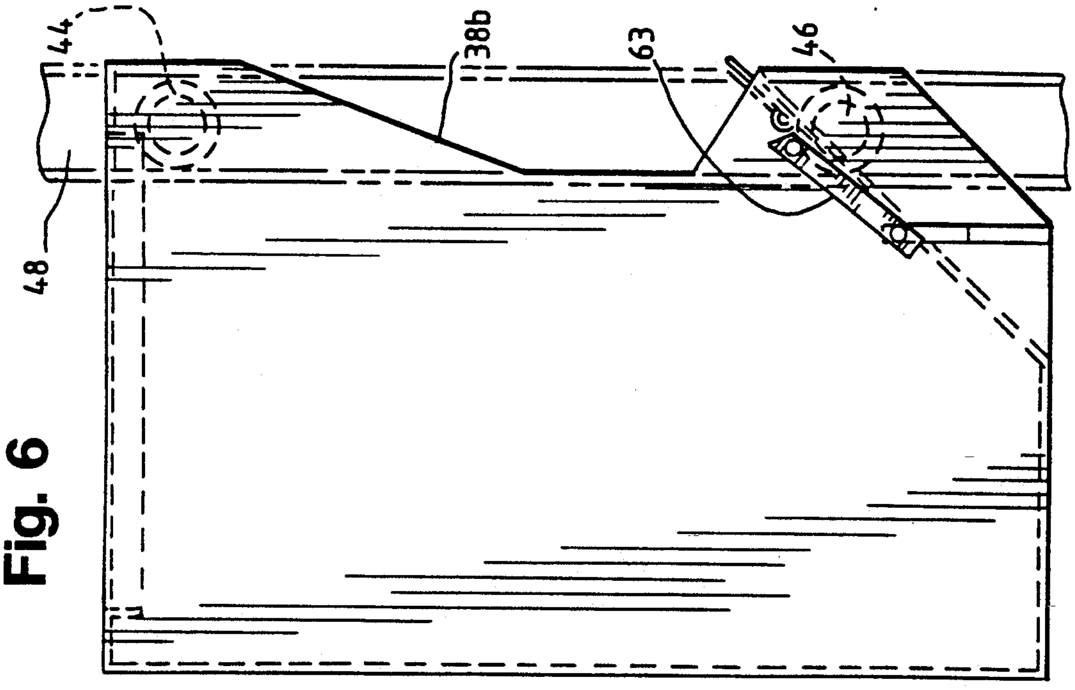
FIG. 6 is an end view of bucket shown in FIG. 5.

The bucket 26 moves substantially vertically, along a side wall panel 42 mounted to the narrow section 16a of the truck body 16. Referring to FIGS. 5–7, the bucket 26 includes a pair of vertically spaced rollers 44, 46 mounted at or near the rear side of the bucket. The rollers 44, 46 roll in a support track 48 mounted to a vertical wall section 50 forming part of the larger dimension portion 16b of the truck body.

Figure 8A:
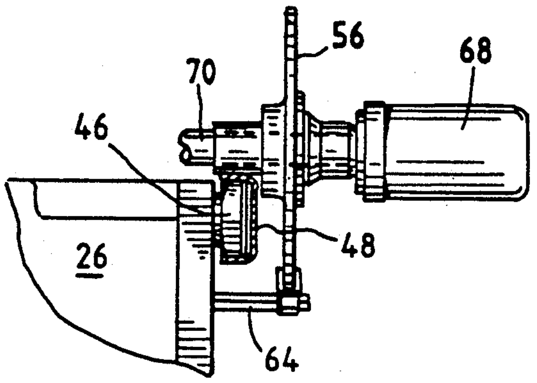
FIGS. 8A–8C are fragmentary views of various portions of the drive system for a bucket, shown in its entirety in FIG. 5.

A similar pair of upper and lower rollers (only the upper roller 53 is shown in FIGS. 3 and 8A) are mounted at the forward end of the bucket 26 and ride in a similar track 49 (shown in FIG. 3) that is mounted to a vertical wall section 52 formed in the forward truck body portion 16a.

Figure 8B:
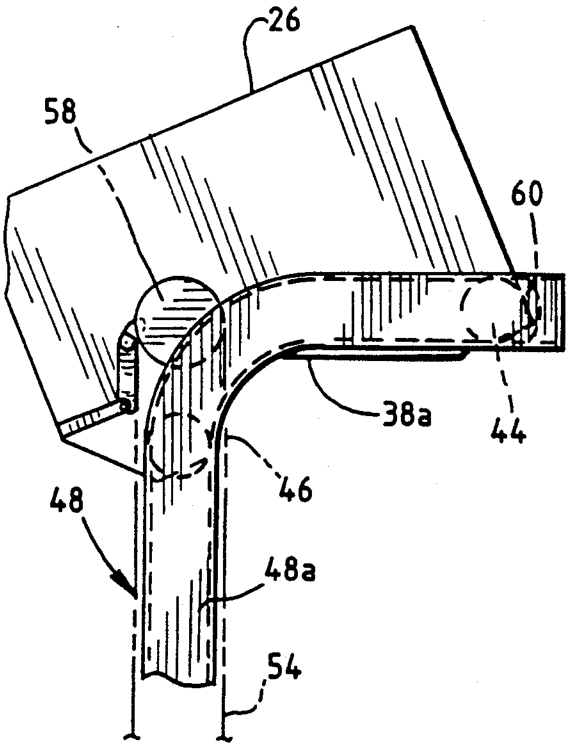
Figure 8C:
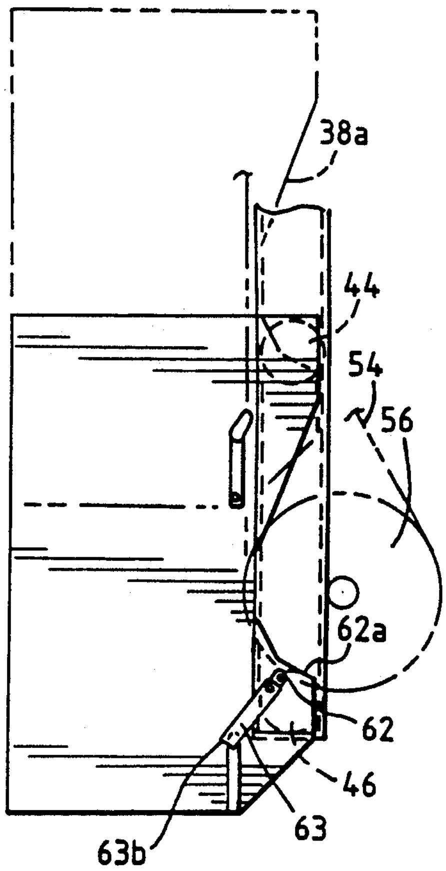
Figure 9:
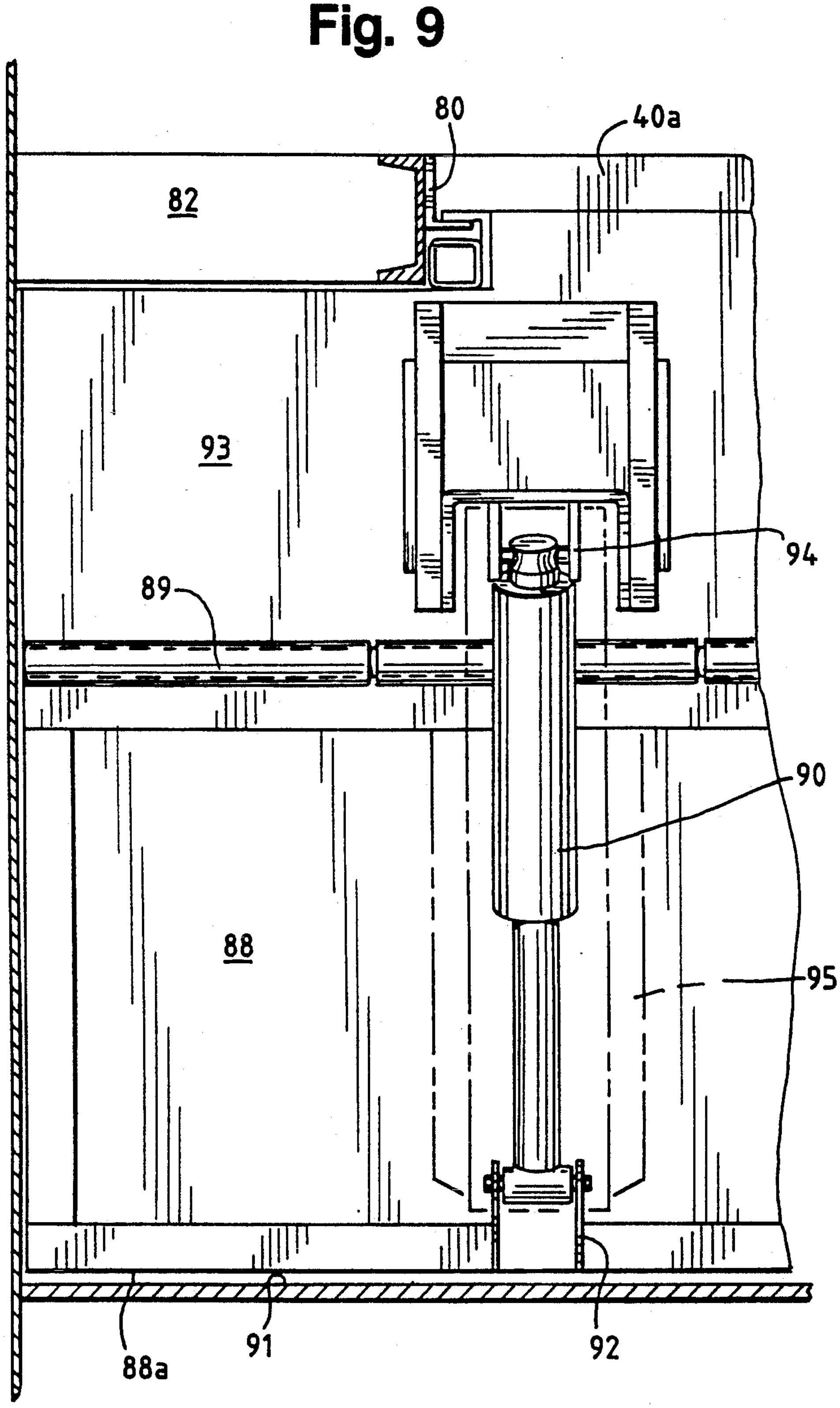
FIG. 9 is a fragmentary end view of a movable divider forming part of the vehicle shown in FIG. 2.

In the preferred embodiment, the bucket 26 is raised and lowered by a chain drive mechanism shown best in FIG. 5. In the illustrated embodiment, the chain drive comprises at least one endless chain 54 reeved around a drive sprocket 56, an upper sprocket 58 and an idler sprocket 60. Referring also to FIGS. 8*l*–8*c*, the bucket 26 is connected to the drive chain 54 by a linkage including link arms 62, 63. One end 62a of the link arm 62 is connected to a link of the chain whereas the other end is pivotally connected to the link arm 63. Referring to FIG. 8c, an outer end 63b of the link 63 is operatively connected to a pin 64 extending from the side or sides of the bucket 26. It should be noted that the link arms 62, 63 may be replaced by a suitably configured single link (not shown).

In one preferred embodiment, the chain drive shown in FIG. 5 is located on either side of the bucket 26 so that both sides of the bucket are concurrently lifted. To achieve this feature, and referring to FIG. 8a, a hydraulic drive motor 68 is operatively connected to one drive sprocket i.e. 56. The drive sprocket 56 is in turn connected to a similar drive sprocket located on the opposite side of the bucket 26 by a drive shaft 70. As a result, rotation imparted by the drive motor 68 to the drive sprocket 56 is transferred to an oppositely located drive sprocket which drives a similar chain interconnected with the opposite end of the bucket 26 by another set of link arms 62, 63 and another pin 64. Thus activation of the hydraulic motor 68 lifts both sides of the bucket simultaneously.

In the preferred and illustrated embodiment, the bucket assembly 26 is powered up and down. In other words, the bucket assembly 26 is not lowered by simply discharging fluid pressure and allowing gravity to lower the bucket assembly. In the preferred arrangement, the drive motor 68 includes a worm gear drive having a sufficiently high ratio to prevent the weight of the bucket 26 from overriding the inefficiency of the worm gear set. As a result, when the drive motor 68 is de-energized, the bucket 26 is inhibited from moving downwardly under its own weight. The drive motor 68 must be energized to power the bucket 26 to ground level. It should be understood, however, that other arrangements may be employed to inhibit unrestrained movement in the bucket assembly 26 and are contemplated by the present invention.

As seen best in FIG. 5, the path of travel for the bucket 26 is defined by the tracks 48, 49. Each track includes a substantially vertical portion (i.e. 48a) which defines a vertical path of travel for the bucket 26 along the side 42 the truck body 16. As the bucket 26 nears the top of the travel path, the tracks 48, 49 veer inwardly and define a substantially 90° curve connected to a transverse section 48b. As the upper bucket support rollers 44 travel from the vertical section to the transverse section 48b of the track, the bucket 26 rotates or tilts inwardly. In the illustrated embodiment the bucket 26 rotates less than 90°.

The interconnection between the drive chain 54 and the bucket 26 provided by the links 62, 63 provides a stop mechanism for delimiting the extent of travel of the bucket. As seen best in FIG. 8c, as the bucket 26 reaches its lower most position, the chain 54 diverges from the vertical and begins pulling the linkage 62, 63 around the sprocket 56. Since the movement of the bucket is limited to vertical motion (at least in this portion of its travel path) by the tracks 48, 49, further downward movement in the bucket 26 is inhibited and in fact, the downward motion of the bucket is decelerated as the linkage 62, 63 begins to follow the contour of the sprocket. Similarly, as the bucket reaches its upper, material discharging position, the path of movement of the bucket is defined by the tracks 48, 49 whereas the link 62 attempts to follow the path of movement of the chain 54. Since the two paths diverge, the bucket 26 stops at the upper position shown in FIG. 5 (and FIG. 8*b*) preventing further movement in the chain 54.

By using a hydraulic motor 68, and a suitable pressure relief valve (not shown), as the bucket 26 reaches the extreme upper and lower positions, motion in the chain drive is stopped and the pressure to the hydraulic motor 68 is relieved through the pressure relief valve. As a result, separate mechanical stops are not needed to delimit the upper and lower positions of the bucket. Moreover, it has been found that the use of the disclosed linkage mechanism between the chains and the bucket provides a cushioning effect so that the bucket is not stopped abruptly as it would be if it struck a mechanical stop. To enhance the cushioning at the upper limit of travel of the bucket, a bumper 69 may be mounted at the upper end of the track 48 (or the track 49 or both) that is abuttably engaged by the rollers 44.

According to a feature of the invention, the bucket 26 does not include an inner defining wall. Instead, the side of the truck body 42 is used to confine the trash within the bins 26*a*, 26*b*. The bins themselves, as indicated above, are at least partially defined by the dividing wall 38. As seen in FIGS. 6 and 7, the dividing wall 38 includes a notched out portion 38*a*. In accordance with the invention, as the bucket reaches the top of the truck body sidewall 42, trash begins discharging from the bucket since it is no longer confined by the wall 42. Thus although the bucket rotates no more than 90° (as shown in FIGS. 5 and 8*b*) all of the trash contained in the bins 26*a*, 26*b* is discharged. To further facilitate the discharge of trash from the bins, an inclined wall 70 is mounted in the bottom of the bin. By eliminating an inner side wall on the bucket itself, the bucket need not be completely overturned in order to discharge its contents. The notch 38a formed in the dividing wall 38 provides clearance for the top edge 42*a* (shown in FIG. 5) of the wall 42 as the bucket is rotated by the tracks 48, 49.

In accordance with a further feature of the invention, doors 72 are pivotally mounted to the top of the forward portion 16*a* of the truck body 16 and pivot about a longitudinal axis 74. The doors 72 overlie the openings 22, 24 and extend beyond the top edge 42*a* of the sidewall 42 so that as the bucket 26 reaches its dump position, it raises the door 72 as shown in FIG. 5. The door 72 then closes as the bucket is lowered to its material receiving position.

Referring to FIG. 4 and 9–11, the volumes of the compartments 18, 20 are adjustable in order to accommodate varying amounts or types of trash. The compartments 18, 20 are separated by an L-shaped dividing wall 40 which includes a transverse, telescoping, floor-like portion 40*a* and a vertical portion 40*b*. The floor-like portion 40*a* (as seen best in FIG. 9) is slidably supported for forward and rearward movement by a pair of L-shaped members 80 (only one is shown) fixed to the side of the vehicle. The floor-like portion 40*a* is dimensioned to fit within the narrow dimension compartment 16*a*. Floor extensions 82 (shown best in FIG. 9) are mounted and extend transversely from the sides of the rear truck body portion 16*b*. The floor-like portion 40*a* slides between the extensions 82. An actuator 84 is centrally mounted within a housing and extends between a fixed mount 86 and a mount 87 forming part of the dividing wall 40. Extension of the actuator 84 drives the dividing wall 40 rearwardly from the innermost position shown in solid line in FIG. 4 to an extended position shown in phantom in FIG. 4. Rearward movement of the wall 40 expands the volume of the forward compartment 18 and decreases the volume of the rear compartment 20. The dividing wall can be positioned at any intermediate position as well. Retraction of the cylinder 84 moves the dividing wall 40 forwardly to reduce the volume of the forward compartment 18. In the preferred embodiment, apertures 85 are formed in the rear truck body portion 16*b* through which an operator can observe the position of the dividing wall 40 and the degree of fullness of the compartments.

The vertical portion 40*b* depends downwardly from the rear edge of the transverse portion 40*a*. As seen best in FIGS. 10 and 11, the downwardly depending portion 40*b* includes a pivotally mounted discharge door 88 hingedly attached to a short vertical wall section 93 by a hinge 89. The lower edge 88*a* of the discharge door 88 moves along a floor 91 of the truck body.

In the preferred construction of this embodiment, a pair of double acting actuators 90 (only one is shown) is used to open the door when the contents of the forward compartment 18 is to be discharged and to maintain closure when collecting material. Although a double acting actuator is used in the preferred embodiment, to simplify the control system a single acting actuator may be used to maintain closure of the door. The weight of the contents collected in the compartment 18 could then be used to open the door when discharge is desired.

In the preferred method of operation, the dividing wall 40 is moved (by the actuator 84) either prior to use or during use to adjust the volumes of the compartments 18, 20. At the conclusion of the collection cycle (or when one or both of the compartments 18,20 is full), the vehicle is taken to a dump site where the contents of the compartment 20 i.e. paper products is first dumped by opening the rear door 32 and raising the truck body 16 using the actuator 30. After the contents of the compartment 20 is discharged, the vehicle is then normally moved to another location where the contents of the compartment 18 is dumped separately. This is achieved by retracting the actuators 90 and then raising the truck body 16 (by the actuator 30) to cause the contents of the compartment 18 to be discharged through the rear of the vehicle after the door 32 is opened.

The actuator 90 acts between a clevis 92 forming part of the discharge door 88 and a fixed clevis 94 mounted to a short vertical wall portion 93 (shown in FIG. 10) extending downwardly from the transverse portion 40*a*. The actuators 90 are each protected by a shield 95 which moves with the door 88.

According to another feature of the invention and referring in particular to FIGS. 3 and 4, a ram (also termed a packer) 101 is used to compact and move the paper products received through the opening 24 towards the rear of the paper products compartment 20.

The ram 101 is reciprocally movable by a double acting actuator 102 which is mounted centrally in the vehicle and shrouded by a housing 104 (shown in phantom in FIG. 3). The ram or packer 101 includes a vertical abutment wall 108 that extends across the width of the compartment 16*a* and a horizontal wall 110 that becomes gradually exposed as the ram extends.

In order to facilitate the conveyance of trash from the openings 22, 24 into the respective compartments, inclined diverting walls 22*a*, 24*a* extend outwardly and downwardly from a vertical dividing wall 112. With the disclosed construction, as the bucket 26 discharges its contents, the inclined wall 22*a*, 24*a* direct the bottles and cans, and paper products, into the respective compartments 18, 20. As seen in FIG. 3, the trash entering the opening 22 travels around the housing 104 that shrouds the ram actuator 102. In addition, the housing 104 also shrouds and protects hydraulic lines for the ram actuator 102, hydraulic lines connected to the dividing wall extension actuator 84 and the hydraulic lines for the door closing actuators 90 all indicated generally by the reference character H. In this way, fluid communication is established from the hydraulic system located outside of the compartments 18, 20 with the hydraulic actuators located within the compartments.

Figure 12:
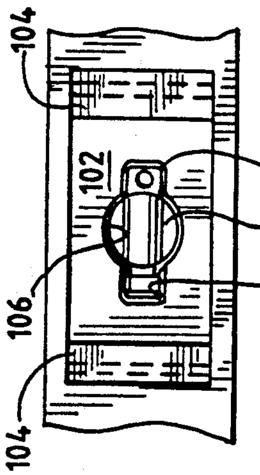
FIG. 12 is a sectional view as seen from the plane indicated by the line 12—12 in FIG. 4; and, FIG. 13 is a schematic representation of a hydraulic control system and components for controlling various actuators in the vehicle.
Figure 11:
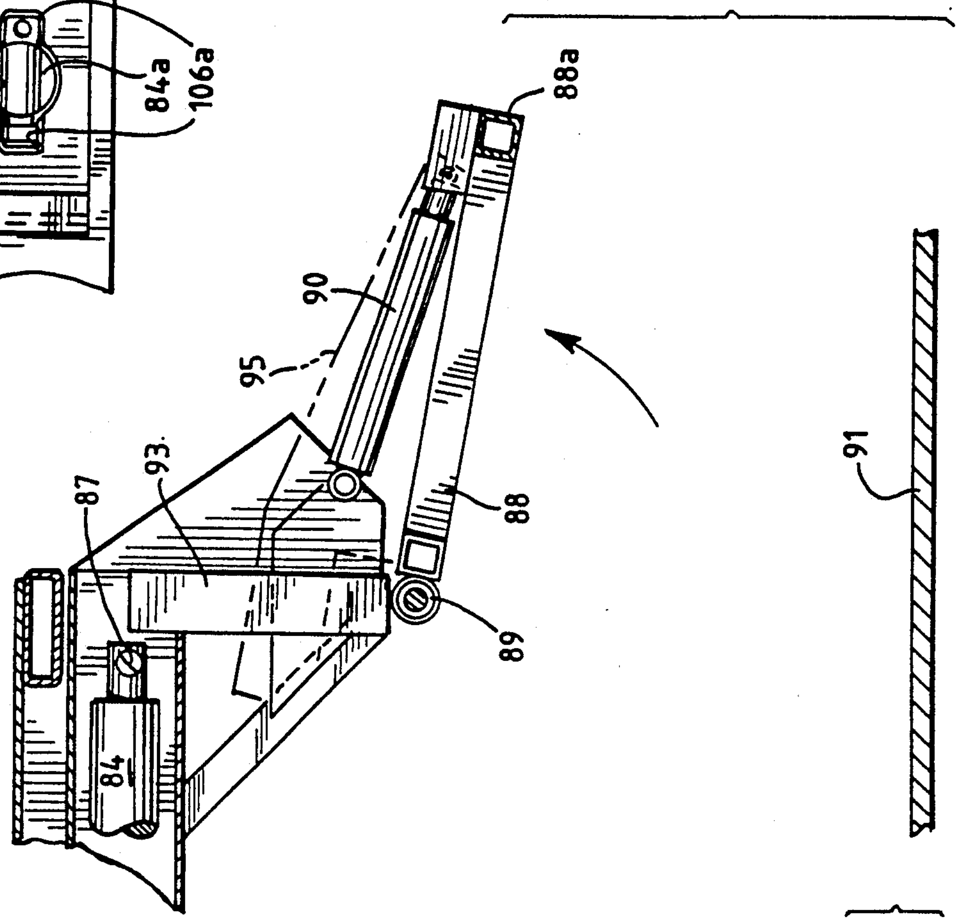
FIGS. 10 and 11 are fragmentary side views of the divider shown in FIG. 9 with a discharge door shown in closed and open positions, respectively.
Figure 10:
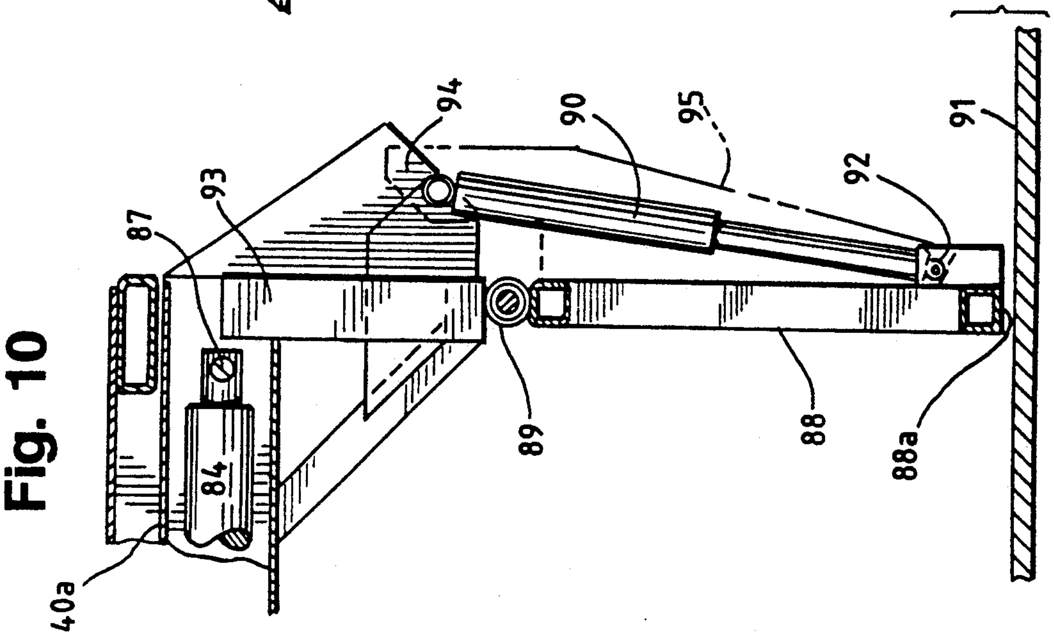

Referring now to FIGS. 4 and 12, the actuator 84 which is used to move the dividing wall 40, is protected from the material in the compartment 18 by a shield 100. According to the invention, a wiper plate 114 (shown in FIG. 12) is floatingly mounted at one end of the shield 100 by a pair of brackets 104. The wiper plate 114 includes an aperture 106 through which the actuator 84 extends and which includes peripheral notches 106*a* through which hoses extend for connection with the actuator 84. As the actuator 84 is extended or retracted, the actuator 84 and supply hoses move through the wiper plate 114. The opening 106 is sized to loosely fit around the hoses and actuator while still preventing the entry of material from the compartment 18 into the shield 100. By using a floating mount (as provided by the brackets 104) the wiper plate 114 can accommodate some side to side movement in the actuator 84 and dividing wall 40 while still inhibiting entry of material into the shield 100.

Figure 13:
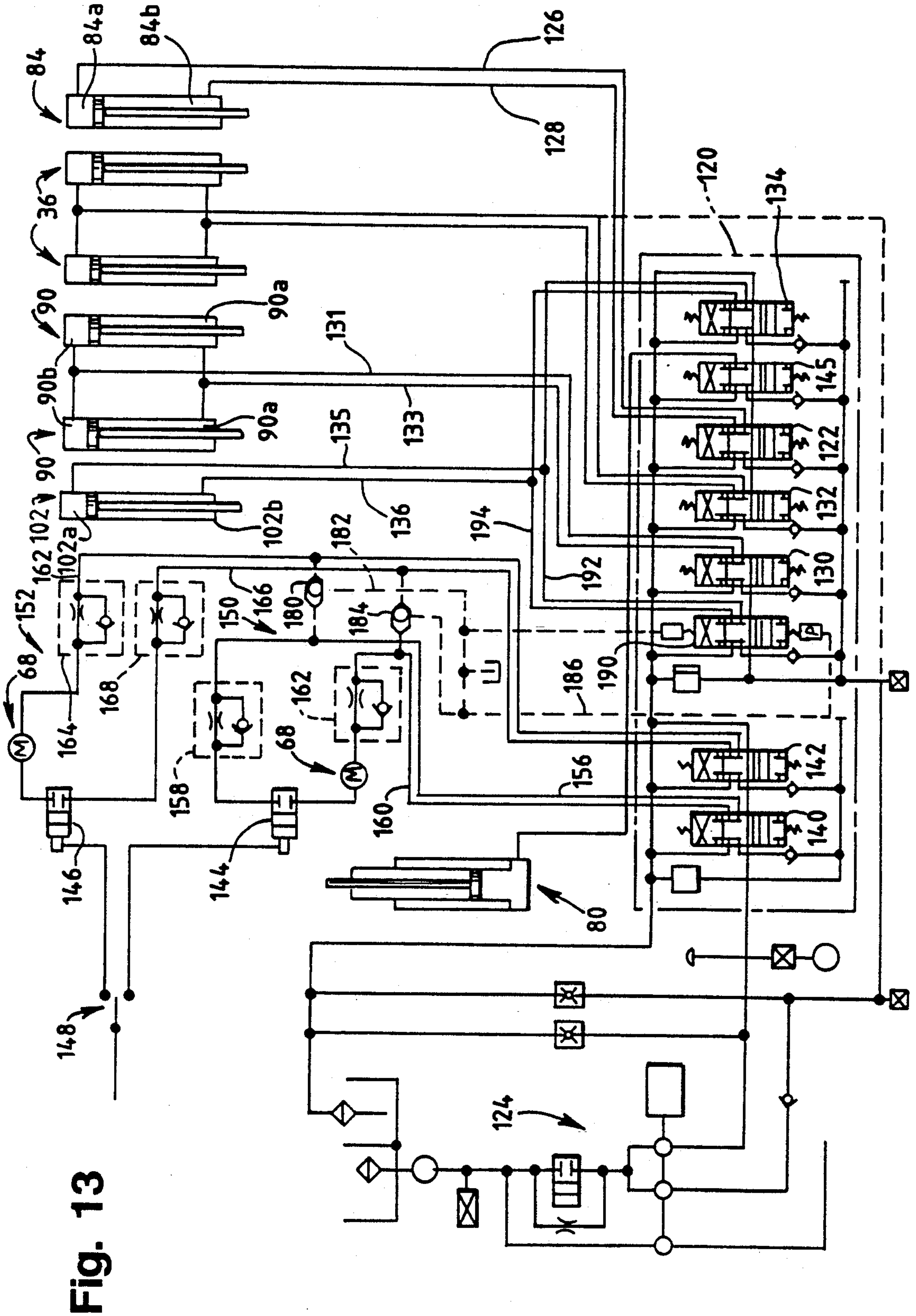

FIG. 13 illustrates a hydraulic control system for controlling the various actuators forming part of the truck body shown in FIG. 1. The various actuators are controlled from an operator accessible control panel 120 (indicated schematically in FIG. 13) which mounts a plurality of conventional, three position, operator control valves. Specifically, a dividing wall control valve 122 controls the communication of pressurized fluid from a source, indicated generally by the reference character 124, to cylinder and rod ends 84*a*, 84*b* of the actuator 84. When the divider wall control valve 122 is shifted upwardly (as viewed in FIG. 13) pressurized fluid is communicated to the cylinder end 84*a* of the actuator 84 via conduit 126. When the valve 122 is shifted downwardly as viewed in FIG. 13, from its neutral position (shown) pressurized fluid is communicated to rod end of the cylinder 84 via conduit 128. Similarly, the actuators 90 which open and close the discharge door 88, are controlled by a three position valve 130. When shifted upwardly from its neutral position shown in FIG. 13, pressurized fluid is communicated to rod ends 90*a* of the actuators 90 via conduit 131 and the door 88 is opened. When the valve 130 shifted downwardly from its neutral position, pressurized fluid is communicated to cylinder ends 90*b* of the actuators 90 via conduit 133 and the door 88 is closed.

A similar three positioned valve 132 controls the actuators 36 which open and close the rear discharge door 32 (shown in FIG. 2). A hoist control valve 145 is used to control actuation of the body hoist actuator 30 in a conventional way.

An operator actuated, packer or ram control valve 134 is provided for extending and retracting the ram actuator 102 (shown best in FIG. 4). The ram 101 is operative to push material towards the rear of the compartment 20 (shown in FIG. 2). Moving the control 134 upwardly as viewed in FIG. 13, causes pressurized fluid to flow into a cylinder end 102*a* of the ram actuator 102 via conduit 135 in order to extend the actuator 102. Moving the control valve 134 downwardly communicates pressurized fluid to a rod end 102*b* of the ram 102 via conduit 136 in order to retract the actuator 102 and hence retract the ram or packer 101.

According to a feature of the invention, cycling of the ram actuator 102 is coordinated with raising and lowering of the bucket assemblies so that the operator is not required to continually operate the ram control valve 134 in order to move or pack the contents of the rear compartment 20. According to this feature of the invention, separate three position, shift valves 140, 142 are provided to control each bucket assembly 26 (shown in FIGS. 1 and 5). In the preferred embodiment, the lifting and lowering of a given bucket assembly 26 is enabled by solenoid controlled blocking valves 144, 146. A switch 148 is operative to communicate power to either of the valves 146, 144 but not both. A neutral position is also provided at which neither valve 144, 146 is energized. In order to enable lifting of a given bucket assembly 26, its associated blocking valve must be energized in order to complete the flow path to its associated fluid pressure operated motor 68.

For purposes of explanation, the valve 140 will be presumed to control the left hand bucket assembly whereas the valve 142 will be assumed to operate the right hand bucket assembly. The hydraulic circuit and associated hydraulic motor 68 for the right hand and left hand bucket assemblies are designated by the reference characters 150, 152, respectively. It should be apparent, that the circuitry and associated control valves 140, 142 can be easily reversed.

In order to enable lifting of the left hand bucket assembly, the blocking valve 144 must be energized in order to complete the circuit to the drive motor 68. Movement of the valve 140 upwardly (as viewed in FIG. 13), will communicate pressurized fluid to the associated drive motor 68 via conduit 156, regulating valve 158 and blocking valve 144. This will produce a given rotation in the actuator motor 68 and cause lowering of the associated bucket assembly. When the valve 140 is moved downwardly (as viewed in FIG. 13) pressurized fluid is communicated to the associated drive motor 68 via conduit 160 and regulating valve 162. This will produce reverse rotation in the fluid pressure operated motor 68 and cause raising of the bucket assembly.

The control valve 142 provides the same control functions as the valve 140 for the right hand bucket assembly. In particular, when the valve is moved upwardly, pressurized fluid is communicated to the associated hydraulic drive motor 68 via conduit 162 and regulating valve 164. When the valve 142 is shifted downwardly (as viewed in FIG. 13) pressurized fluid is communicated to the motor 68 via conduit 166, regulating valve 168 and the blocking valve 146.

As seen in FIG. 13, the conduit 156 associated with the left hand bucket assembly and the conduit 162 associated with the right hand bucket assembly are interconnected by a shuttle valve 180 which selectively communicates one of the conduits 156, 162 with a pilot conduit 182. A similar shuttle valve 184 interconnects the conduit 160 associated with the left hand bucket assembly with the conduit 166 associated with the right hand bucket assembly. The shuttle valves 180, 184 selectively communicates the higher pressurized one of their associated conduits with the associated pilot passages 182, 186.

When the left hand bucket assembly is enabled (upon actuation of the blocker valve 144) upward movement of the valve 140 to lower the bucket assembly 26, pressurizes the conduit 156 and hence the pilot passage 186 via the shuttle valve 184. The pilot passage 186 is connected to a ram control valve 190 which, upon pressurization of the pilot passage 186 shifts the valve 190 to its upper position. With the valve 190 in its upper position, a conduit 192 which communicates with the conduit 135 and hence the cylinder end of the ram actuator 102 is pressurized. Pressurization of the cylinder end **102*a* extends the actuator 102, moving the ram or packer 101** towards the rear.

When the valve 140 is shifted downwardly to raise the bucket assembly, pressurized fluid in the conduit 160 is conveyed to the pilot passage 182 via the shuttle valve 180. The pilot passage 182 communicates with the upper end of the packer control valve 190 and when pressurized, shifts the valve 190 to its lower position. In the lower position, pressurized fluid is communicated to the rod end **102*b* of the ram 102 via conduit 194 (which communicates with the conduit 136). As a result, as the bucket assembly is being raised the ram 102 is retracted. With the disclosed hydraulic system, movement in the ram actuator 102 is coordinated with the raising and lowering of a bucket assembly so that the ram actuator 102** is reciprocated (retracted and extended) as a bucket assembly is lowered and raised.

When the right hand bucket assembly is enabled upon actuation of the blocking valve 146, the shuttle valves 180, 184 operate to pressurize the pilot passage 182, 186 whenever the conduits 162, 166 are pressurized in order to lower and raise the right hand bucket assembly, respectively.

Figure 15:
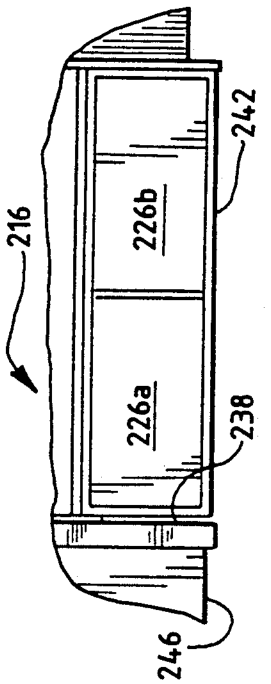
FIG. 15 is a fragmentary top view of the vehicle shown in FIG. 14.
Figure 14:
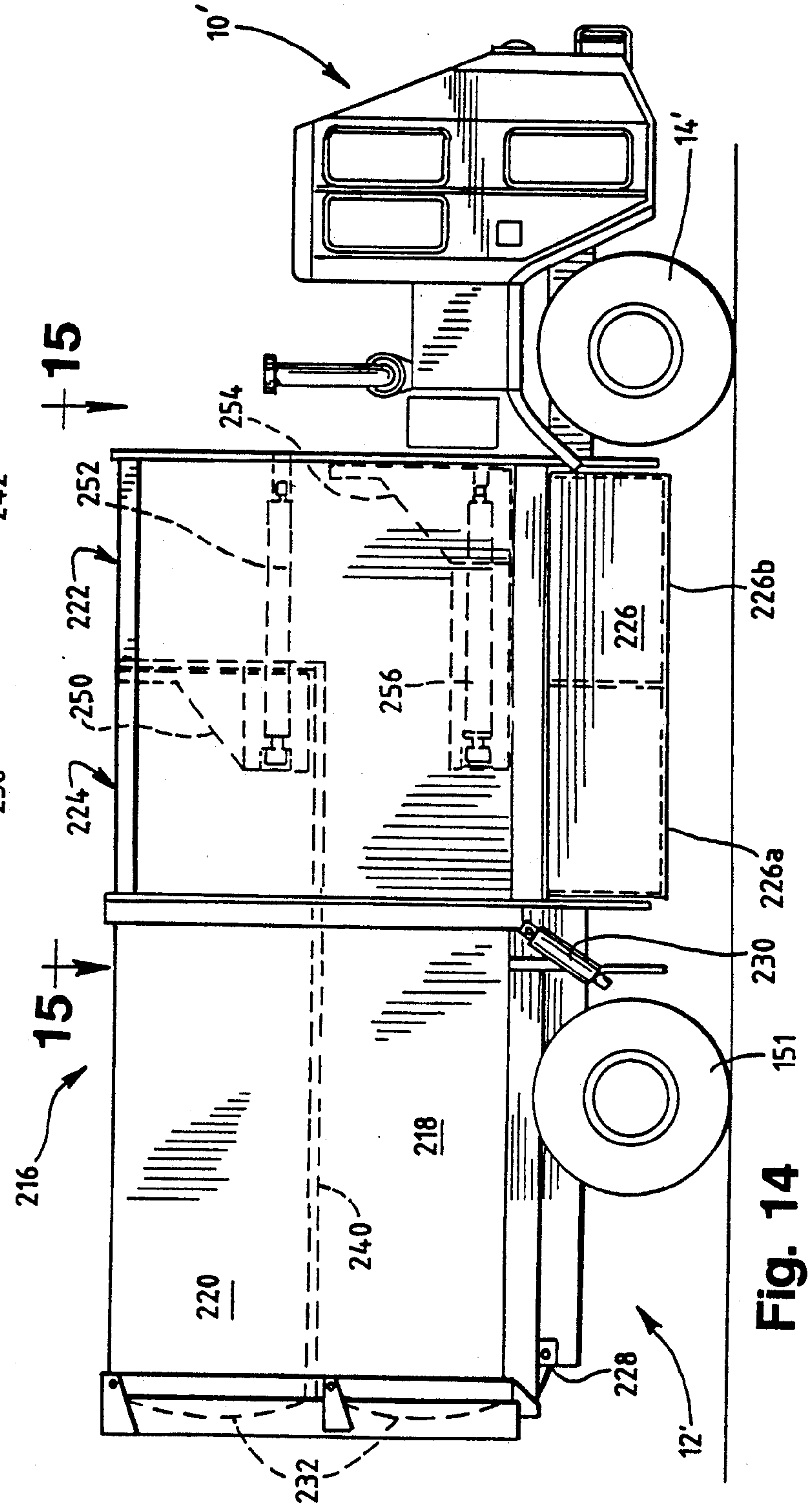
FIG. 14 is a side elevational view of a vehicle constructed in accordance with another embodiment of the invention.

FIGS. 14 and 15 illustrate another embodiment of a vehicle for material or waste hauling. The vehicle includes a conventional truck cab 10' mounted to a truck frame, indicated generally by the reference character 12'. Wheels 14', 15' as well as a conventional power train (not shown) for driving the rear wheels 15' are also mounted to the frame.

In accordance with this embodiment of the invention, a truck body indicated generally by the reference character 216 is mounted to the truck frame 12'. The truck body 216 defines two internal compartments 218, 220 which receive trash through associated openings 222, 224, formed in the top of the truck body 216. Trash is lifted and dumped into the openings 222, 224 by a single bucket assembly 226. The truck body 216 is preferably pivotally mounted to the frame at pivot connections 228 such that the truck body 216 can be pivoted upwardly by lifting cylinders 230 located just ahead of the rear wheels 15'. The body 216 pivots about a transverse axis defined by the pivots 228.

According to this embodiment of the invention, the truck body is divided into upper and lower trash receiving compartments 220, 218 by a fixed, transverse dividing wall 240. Each compartment includes a rear discharge door 232 which in this embodiment, are preferably manually released (as opposed to locked and unlocked by actuators). In order to discharge the contents of the upper compartment 220, the upper discharge door 232 is released and the truck body 216 raised via the actuators 230. As the body 216 raises, the contents of the upper compartment 220 will be discharged through the door 232. Similarly to discharge the contents of the lower compartment 218, its associated door 232 is released and the body 216 raised.

The bucket assembly 226 is similar in construction to the bucket 26 of the first embodiment. It is divided into two side-by-side isolated bins **226*a*, 226*b*. Trash placed in the bin 226*a* is conveyed to the upper compartment via the opening 224 whereas trash placed in the bin 226*b* is conveyed to the lower compartment 218, via the opening 222. Like the first embodiment, both compartments 218, 220** can be filled simultaneously with separated trash.

As seen in FIG. 15, the bucket 226 is located in a recess 238 defined by the truck body 216. As a result, the bucket 226 does not extend beyond the perimeter of the truck body. Preferably, an outside wall 242 of the bucket 226 is flush with an outside wall 246 of the truck body 216.

The bucket 226, in the illustrated embodiment, is raised and lowered by a mechanism similar to that disclosed in connection with the first embodiment. In particular, chains (not shown) and a hydraulic motor (also not shown) are used to raise and lower the bucket 226. Alternate mechanisms are also contemplated for raising and lowering the bucket 226.

In accordance with this embodiment of the invention, each compartment 218, 220 includes an associated packing blade to move material towards the rear of each compartment. In particular, a packing blade 250 and an associated actuator 252 are located in the upper compartment whereas a packing blade 254 and associated actuator 256 are located in the lower compartment. Extension of the actuators 252, 256 causes their associated packing blades 250, 254 to move rearwardly in order to push material from beneath the openings 222, 224 towards the rear of their associated compartments. The packing blades 252, 254 are of a construction that is similar to the ram 101 disclosed in connection with the first embodiment (shown best in FIG. 4).

Figure 16:
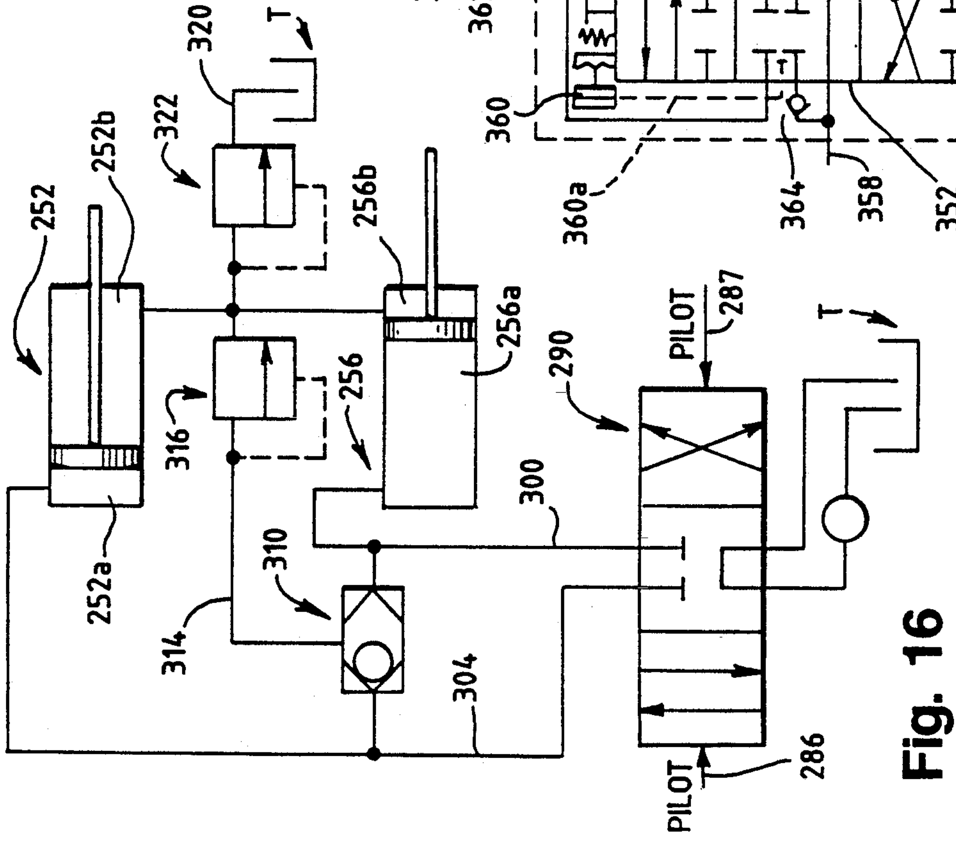
FIG. 16 is a schematic representation of a portion of a hydraulic control system forming part of the vehicle shown in FIG. 14; and, FIG. 17 is a schematic representation of another embodiment of a portion of a hydraulic control system forming part of the vehicle shown in FIG. 14.

In accordance with a preferred feature of this embodiment, the actuators 252, 256 are automatically cycled whenever the bucket assembly 226 is raised and lowered. Referring to FIG. 16, a three-position valve 290 controls the extension and retraction of the packer actuators 252, 256. The valve 290 corresponds to the ram control valve 190 in FIG. 13. The valve 290 may be pilot pressure operated by selective pressurization of the pilot lines 282, 286 which correspond in function to the pilot lines 182, 186 in FIG. 13. Thus, when a bucket control valve (not shown but similar to the control 140 in FIG. 13) is moved to a position at which the bucket assembly 226 is raised, the pilot passage 282 is pressurized. Pressurization of the pilot passage 282 shifts the valve towards the left as viewed in FIG. 16 and pressurizes the conduit 300. In accordance with the invention, the conduit 300 communicates with a cylinder end **256*a* of the lower packer actuator 256**.

In accordance with this embodiment of the invention, in order to minimize the volume of pressurized fluid needed in order to drive the actuators 252, 256, only a single actuator receives pressurized fluid from the source in any given cycle. The fluid discharged by the actuator that is receiving pressurized fluid from the source is used to drive the other actuator. In particular, when the conduit 300 is pressurized, the actuator 256 is extended causing fluid to be discharged, under pressure, from a rod end 256*b* of the cylinder actuator 256. The fluid discharged by the actuator 256 is communicated to the rod end of the actuator 252 which causes retraction of the actuator 252. When the valve 290 is shifted to the right as viewed in FIG. 16 by pressurization of the pilot passage 286, pressurized fluid is communicated to the cylinder end of the upper packing blade actuator 252 to cause its extension. Fluid discharged from the rod end 252*b* of the actuator 252 in turn retracts the actuator 256. With the disclosed hydraulic circuit, the volume of pressurized fluid needed to operate the actuators 252, 256 is reduced substantially.

A shuttle valve 310 interconnects the conduits 300, 304 and selectively communicates the higher pressurized one of the conduits 300, 304 with a discharge conduit 314. The conduit 314 includes a pressure relief valve 316 which communicates with a tank conduit 320 that includes another pressure relief valve 322. The circuit provided by the conduits 314, 320 and pressure relief valves 316, 322 provide an exhaust path for fluid in the conduits 300, 304 should one of the actuators 252, 256 bottom out before the other cylinder has completed its movement. For example, if the conduit 304 is pressurized to extend the actuator 252, the fluid discharged by the actuator 252 into the actuator 256 retracts the actuator 256. If the actuator 256 retracts fully before the actuator 252 is fully extended, the relief valve 322 will open to allow fluid from the rod end of the cylinder 252 to be discharged to tank in order to allow the actuator 252 to fully extend. Absent the relief valve 322, a hydraulic lock would exist which would inhibit the actuator 252 to extend fully if the actuator 256 reached its fully retracted position before the actuator 252 was fully extended. The relief valve 316 relieves pressure in the pressurized conduits 300, 304.

With the disclosed hydraulic circuit, both packing blades 250, 254 are automatically cycled whenever the bucket 226 is raised and lowered. In addition, the volume of pressurized fluid needed to effect reciprocation in both actuators 252, 256 is reduced.

Figure 17:
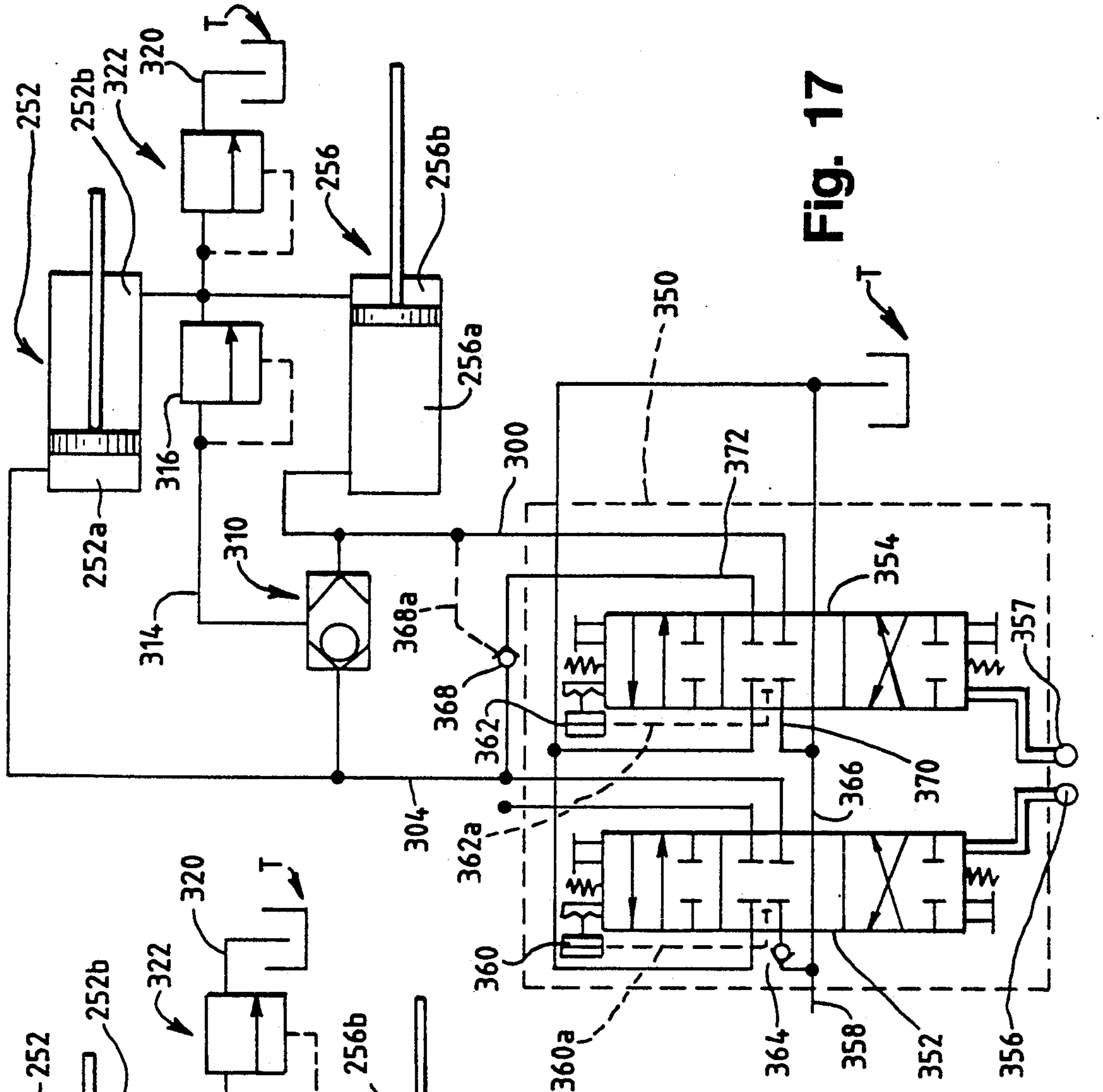

FIG. 17 illustrates a control system for automatically reciprocating both packing blade actuators 252, 256 by one operation of a operator control. Although the control is referred to as a manual packing blade control, the disclosed control arrangement causes both actuators 252, 256 to be reciprocated upon movement in a control lever or control levers. In particular, the control device is designated generally by the reference character 350. The control 350 includes two three position valves 352, 354 that can be jointly operated by adjacent operating levers 356, 357. The three position valves 352, 354, include detents which hold the associated spools in a shifted position until a predetermined pressure is reached in a pressure line.

The detents are indicated schematically by the reference characters 360, 362. The detents, as is known, may be an integral part of the valve assembly. To facilitate the explanation, components that are the same as those shown in FIG. 16 are designated by the same reference characters.

When reciprocation of the actuators 252, 256 is desired, independent of actuation of the bucket assembly 26, the operator control levers 356, 357 are jointly moved to shift the valves 352, 354 downwardly. In this position, pressurized fluid from a conduit 358 is fed to the conduit 304 via a branch conduit 363 and check valve 364. When the valve 352 is in the lower position, pressurized fluid from the conduit 358 cannot pass through the valve 352 and hence, the valve 354 does not receive pressurized fluid from an intermediate conduit 366 which communicates with the conduit 358 via the valve 352 when in its center position (shown in FIG. 17).

When the operating levers 356, 357 are concurrently moved to shift both valves 352, 354 to their lower position, the associated detents 360, 362 operate to maintain the valves 352, 354 in their lower positions until a predetermined pressure is reached in the supply conduit 358, or in the intermediate supply conduit 366. In particular, with the valve 352 in the lower position, pressurized fluid is delivered to the cylinder end 252*a* of the cylinder 252, via the conduit 304, until the actuator is fully extended (or until material within the compartment prevents further movement in the associated packing blade). Upon reaching a predetermined pressure in the line 360 (as sensed in pilot line 360*a*), the detent 360 releases allowing the spool 352 to return to its center position.

With the valve in the center position, pressurized fluid in the conduit 360 is allowed to enter the intermediate conduit 366 and is delivered to the conduit 300 via branch conduit 370 (via valve 354 which is still locked in the lower position by the detent 362). Pressurized fluid will flow into the cylinder end 256*a* of the actuator 256 via the conduit 300 until the actuator 256 is fully extended or until the associated packing blade is prevented from further movement by material in the compartment. A pilot operated check valve 368 opens to allow fluid discharged from the cylinder end 252*a* of the actuator 252 to return to tank via return conduit 372 when the conduit 300 is pressurized as sensed in sensing line 368*a*. The pilot check valve 368 prevents the flow of fluid into the return conduit 372 when both valves 352, 354 are shifted upwardly (which pressurizes the conduit 304 via valve 352).

The rise in pressure in the line 300 is sensed by the detent mechanism via the pilot line 362*a* and upon reaching a predetermined pressure in the line 300, the detent releases the spool 354 allowing it to return to its center position. As a result, with the disclosed control arrangement, a single movement in the operating levers 356, 357 cycles both actuators 252, 256. Moreover, the disclosed control arrangement does not require the operator to hold the operating levers 356, 357 throughout the cycle. The operator simply pushes the levers to their detented positions and then releases them.

The operating levers 356, 357 can also be operated independently and each lever can shift their associated valve upwardly or downwardly. The levers can also be held in either of these positions independent of the detent mechanism. This mode of operation may be employed to move an individual packing blade and/or to resynchronize the actuators 252, 256 should this be necessary due to a jam or malfunction.

Although the invention has been described with a certain degree of particularity it should be understood that those skilled in the art can make changes to the invention without departing from the spirit or scope of the invention as hereinafter claimed.

We claim:

1. Material collecting apparatus, comprising:

(a) structure defining a truck body having a front and rear mountable to a truck frame;

(b) front and rear material-receiving compartments defined and separated in part within the body by a moveable dividing wall; said moveable dividing wall including a transverse section slideable along a track extending longitudinally with respect to said truck body and a substantially vertically oriented section extending downwardly from said transverse section;

(c) a bucket moveable between a loading position and a discharge position along a path of travel and along at least one side of said truck body;

(d) a hoist mechanism for transporting said bucket from said loading position to said discharge position; and (e) a recess which is defined by said truck body at the front thereof and within which said bucket travels for a portion of its path of travel.

2. The apparatus of claim 1 wherein said vertically oriented section includes a pivotally mounted discharge door through which material collected in said front compartment is discharged from a rear portion of said truck body.

3. The apparatus of claim 2 which further comprises actuating means for selectively pivoting said discharge door.

4. The apparatus of claim 3 wherein said truck body includes a pivotally mounted rear door through which trash collected in said rear compartment is discharged.

5. The apparatus of claim 4 wherein said truck body is pivotally mounted on a vehicle frame and includes dumping means for raising said truck body about a substantially transverse pivot axis whereby material collected in said truck body is discharged through said rear door.

6. The apparatus of claim 5 wherein said rear compartment includes a ram means for pushing material received in said compartment towards a rear region of said compartment.

7. The apparatus of claim 6 wherein said truck body includes means for permitting the position of said dividing wall to be determined.

8. The apparatus of claim 7 wherein said permitting means comprises an aperture in at least one side wall of said truck body.

9. The apparatus of claim 1 wherein said truck body includes a narrower dimensioned section and said recess is defined at least in part by said narrower dimensioned section.

10. The apparatus of claim 6 further including a fluid pressure operated control system for operating said ram means and said bucket, said control system including means for coordinating movement of said bucket and said ram means.

11. Apparatus as in claim 10, wherein:

said coordinated movement effected by said control system comprises (i) movement of the ram means towards the forward portion of said rear compartment in response to said bucket moving toward said discharge position and (ii) movement of said ram means towards said rear region of said rear compartment in response to said bucket moving toward said loading position.

12. Material collecting apparatus, comprising:

a) structure defining a truck body mountable to a truck frame;

b) said truck body including front and rear trash receiving compartments divided in part by a longitudinally moveable dividing wall;

c) a bucket moveable between a loading position and a discharge position along at least one side of said truck body;

d) a hoist mechanism for transporting said bucket from said loading position to said discharge position; and, e) said dividing wall including a transverse section dividing said truck body into upper and lower compartment portions.

13. The apparatus of claim 12 wherein said truck body defines longitudinally adjacent inlet openings respectively communicating with said upper and lower compartment portions.

14. Material collecting apparatus, comprising:

(a) structure defining a truck body mountable to a truck frame;

(b) said truck body including front and rear material receiving compartments divided in part by a moveable dividing wall;

(c) a bucket moveable between a leading position and a discharge position along at least one side of said truck body;

(d) a hoist mechanism for transporting said bucket from said loading position to said discharge position; and (e) said dividing wall including a transverse section and vertical section, whereby said truck body is divided into a rear compartment which is L-shaped and a front compartment which is rectangular, with a portion of said front compartment lying below a portion of said L-shaped compartment.

15. The apparatus of claim 14 wherein said vertical section of said moveable dividing wall includes a discharge door for discharging material from said front compartment into said rear compartment.

16. The apparatus of claim 15 wherein said truck body includes a rear door through which material is dumped from said rear compartment and then from said front compartment after said discharge door is opened.

17. The apparatus of claim 14 wherein at least one of said compartments includes a packing blade for redistributing material in said compartment.

18. The apparatus of claim 19 wherein said packing blade is located in said rear L-shaped compartment.

19. Material collecting apparatus, comprising:

(a) structure defining a truck body which has a material-receiving compartment:

(b) said truck body being defined by at least one planar sidewall;

(c) a loading device for transporting material between a loading position and a discharge position at which material from said loading device is dumped into said compartment; and (d) a structure defining a path of travel for said loading device such that said loading device moves along said sidewall in close proximity thereto, material being contained in said loading device jointly by a plurality of external containing walls of the loading device and by said truck body sidewall; and, (e) said truck body sidewall cooperating with the containing walls of said loading device to maintain material within said loading device until said loading device reaches said discharge position at which material is free to fall from said loading device as said loading device moves past an upper portion of said truck body sidewall.

20. The apparatus of claim 19 wherein said structure further defines a trackway having a vertical portion and a transverse portion along which said loading device travels, said sidewall cooperating with said loading device when said loading device is traveling along said vertical portion of said trackway, and said sidewall arranged to allow material to discharge from said loading device as said loading device moves from said vertical portion of said trackway to said transverse portion of said trackway.

21. The apparatus of claim 19 wherein said truck body is divided into at least two substantially isolated compartments and said loading device comprises a bucket assembly having dual, material receiving bins, said bucket assembly and sidewall arranged such that material from said bins is discharged into respective compartments in said truck body as said bucket assembly moves to a discharge position.

22. Apparatus as in claim 19, wherein:

the containing walls of the loading device include a bottom wall and side walls closing all but one side of the loading device, the one open side of the loading device being adjacent to, and being closed by, the planar side wall when the loading device is in the loading position and as the loading device moves between the loading and discharge positions.

23. Material collecting apparatus, comprising:

(a) structure defining a truck body mountable to a truck frame;

(b) partition means disposed within said truck body and dividing said truck body into first and second compartments;

(c) discharge doors associated with each compartment;

(d) a bucket moveable between a loading position and a discharge position along at least one side of said truck body;

(e) first and second longitudinally spaced material-receiving openings located at the discharge position of the bucket to receive material from the bucket, the first opening communicating with the first compartment and the second opening communicating with the second compartment;

(f) a hoist mechanism for transporting said bucket between said loading position and said discharge position;

door means normally closing the openings for opening simultaneously with movement of the bucket to the discharge position and for closing simultaneously with movement of the bucket to the loading position, (h) first and second packing blades respectively associated with said first and second compartments;

(i) actuator means for causing reciprocating movement of said packing blades and, (j) control means for controlling the actuation of said actuators such that when one of said actuators is extended, said other actuator is retracted.

24. The apparatus of claim 23 wherein said means for controlling said actuators includes means for conveying fluid discharge by one actuator to said other actuator whereby said other actuator is actuated.

25. The apparatus of claim 24 wherein movement of said packing blade actuators is coordinated with movement in said bucket.

26. The apparatus of claim 25 further including pressure relief valve means for discharging fluid from said control means when one of said actuators reaches a predetermined position before said other actuator reaches an associated predetermined position.

27. Material collecting apparatus, comprising:

(a) structure defining a truck body mountable to a truck frame;

(b) said truck body including upper and lower material-receiving compartments divided by a partition;

(c) said truck body defining an external recess located near a forward portion of said truck body;

(d) a bucket positioned within said recess and moveable between a loading position and a discharge position;

(e) first and second longitudinally spaced material-receiving opening located at the discharge position to receive material from the bucket, the first opening communicating with the upper compartment and the second opening communicating with the lower compartment;

(f) a hoist mechanism for transporting said bucket between said loading position and said discharge position;

(g) packing blade means disposed in each of said compartments operative for pushing material received through said compartment openings towards a rear region of its associated compartment;

actuator means for selectively reciprocating the packing blade means; and (i) packing blade control means for coordinating movement of said packing blades by said actuator means with transport of said bucket by said hoist mechanism.

28. The apparatus of claim 27 wherein said control means further includes means for conveying fluid exhausted by one actuator means to another actuator whereby said other actuator means is caused to actuate to associated blade.

29. Apparatus as in claim 27, wherein:

the coordinated movement effected by said control means comprises movement of the packing blades towards the rear region of their compartments in response to movement of the bucket toward the loading position after it has occupied the discharge position.

30. Apparatus as in claim 29, wherein:

the coordinated movement effected by said control means further comprises movement of one packing blade toward the rear region of its compartment followed by movement of the other packing blade toward the rear of its compartment.

31. Collecting apparatus for recyclable material, which apparatus comprises:

(a) a truck body having a top and bottom which longitudinally extends between a forward end and a rearward end, the truck body being mountable to a truck frame so that its forward end is adjacent to a cab on the frame, the body enclosing an interior volume and having an exterior, longitudinally and vertically extending recess at its forward end, which recess extends between the forward end and a location intermediate the forward and rearward ends, the recess including a generally longitudinally and vertically extending, generally planar exterior wall of the body;

(b) a wall which divides the volume into separated compartments for receiving different recyclable materials, the wall having a generally horizontal portion which extends transversely and longitudinally;

(c) longitudinally spaced openings in the top of the body, each opening communicating with one of the compartments;

(d) a bucket located in the recess at the forward end of the body, the bucket including a bottom wall and side walls closing all but one side of the bucket, the one open side of the bucket being adjacent to and closed by the exterior wall of the body when the bucket is in the loading position and when the bucket moves between the loading and discharge positions; the bucket being vertically movable in and along the recess between a loading position adjacent the bottom of the body and a discharge position adjacent the top of the body, and the bucket being substantially contained in the recess and not significantly transversely protruding beyond the recess in either position or when moving therebetween;

(e) a wall for dividing the bucket into separated bins for respectively receiving the different recyclable materials, each bin being aligned with one of the openings when the bucket is at its discharge position; and (f) means for moving the bucket between the loading position, whereat the bins are fillable with recyclable materials from a site which is near the cab and at a convenient height, and the discharge position and for dumping the recyclable material from the bins into the compartments via the openings aligned therewith when the bucket is at the discharge position.

32. Apparatus as in claim 31, wherein:

dumping of the material is effected by rotation of the bucket after the one open side clears the top of the exterior wall, the one open side of the bucket permitting dumping to occur following less than 90° of rotation of the bucket.

33. Collecting apparatus for recyclable material, which apparatus comprises:

(a) a truck body having a top and bottom which longitudinally extends between a forward end and a rearward end, the truck body being mountable to a truck frame so that its forward end is adjacent to a cab on the frame, the body enclosing an interior volume and having an exterior, longitudinally and vertically extending recess at its forward end, which recess extends between the forward end and a location intermediate the forward and rearward ends;

(b) a wall which divides the volume into separated compartments for receiving different recyclable materials, the wall having a generally horizontal portion which extends transversely and longitudinally;

(c) longitudinally spaced openings in the top of the body, each opening communicating with one of the compartments;

(d) a bucket located in the recess at the forward end of the body, the bucket being vertically movable in and along the recess between a loading position adjacent the bottom of the body and a discharge position adjacent the top of the body, the bucket being substantially contained in the recess and not significantly transversely protruding beyond the recess in either position or when moving therebetween;

(e) a wall for dividing the bucket into separated bins for respectively receiving the different recyclable materials, each bin being aligned with one of the openings when the bucket is at its discharge position;

(f) means for moving the bucket between the loading position, whereat the bins are fillable with recyclable materials from a site which is near the cab and at a convenient height, and the discharge position and for dumping the recyclable material from the bins into the compartments via the openings aligned therewith when the bucket is at the discharge position;

(g) a first ram in one compartment for pushing material therein toward the rearward end; and (h) first means for selectively operating the first ram.

34. Apparatus as in claim 33, which further comprises:

a second ram in the other compartment for pushing material therein toward the rearward end, and second means for selectively operating the second ram.

35. Apparatus as in claim 34, wherein:

the first and second means operate the rams so that when the bucket is in the loading position, one of the rams is normally located at the forward end and the other ram is normally located toward the rearward end; when the bucket is moving from the loading position toward the discharge position, the ram at the forward end moves toward the rearward end and the ram which is toward the rearward end moves to the forward end; and when the bucket is moving from the discharge position toward the loading position, the rams return to their normal positions.

36. Collecting apparatus for recyclable material, which apparatus comprises:

(a) a truck body having a top and bottom enclosing a volume for receiving material; the truck body including a generally planar exterior wall;

(b) a bucket movable between a loading position, which is toward the bottom of the body, and a discharge position which is toward the top of the body, material placed in the bucket at the loading position begin dumped into the volume at the discharge position; the bucket including a bottom wall and side walls closing all but one side of the bucket, the one open side of the bucket being adjacent to and closed by the exterior wall of the body when the bucket is in the loading position and when the bucket moves between the loading and discharge positions; and (c) means for moving the bucket between the loading and discharge positions.

37. Apparatus as in claim 36, wherein;

dumping of the material is effected, in part, by the one open side of the bucket clearing the top of the exterior wall of the body as the bucket reaches the discharge position.

* * * * *

UNITED STATES PATENT AND TRADEMARK OFFICE

CERTIFICATE OF CORRECTION

PATENT NO. : 5,316,430

DATED : May 31, 1994

INVENTOR(S) : Larry D. Horning, et al.

It is certified that error appears in the above-indentified patent and that said Letters Patent is hereby corrected as shown below:

Column 4, line 12 - delete "," (2nd occurrence).
Column 4, line 43 - delete "," (2nd occurrence).
Column 4, line 51 - delete "cu"

Column 8, line 12 - delete "81-8c" and insert "8a-8c"
Column 8, line 57 - insert "of" after "42"
Column 18, line 28 - delete "leading" and insert "loading"
Column 20, line 45 - delete "to" and add "its"
Column 22, line 53 - delete "begin" and insert "being"
Column 18, line 51 - delete "19" and insert "17"

Signed and Sealed this

Eleventh Day of October, 1994

Attest:

BRUCE LEHMAN

*Attesting Officer* *Commissioner of Patents and Trademarks*